US012372903B2

(12) United States Patent
Ikebuchi et al.

(10) Patent No.: US 12,372,903 B2
(45) Date of Patent: Jul. 29, 2025

(54) FIXING DEVICE AND IMAGE FORMING APPARATUS

(71) Applicants: Yutaka Ikebuchi, Kanagawa (JP); Shigeo Nanno, Kyoto (JP); Hitoshi Fujiwara, Tokyo (JP); Yuusuke Furuichi, Kanagawa (JP)

(72) Inventors: Yutaka Ikebuchi, Kanagawa (JP); Shigeo Nanno, Kyoto (JP); Hitoshi Fujiwara, Tokyo (JP); Yuusuke Furuichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 18/403,753

(22) Filed: Jan. 4, 2024

(65) Prior Publication Data

US 2024/0241467 A1 Jul. 18, 2024

(30) Foreign Application Priority Data

Jan. 18, 2023 (JP) ................................ 2023-005895

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2005/0163540 A1* 7/2005 Umezawa .......... G03G 15/2053 399/328
2016/0223959 A1* 8/2016 Uekawa ............. G03G 15/2064
2018/0120743 A1* 5/2018 Arakawa ............ G03G 15/2053
2023/0375966 A1 11/2023 Nanno

FOREIGN PATENT DOCUMENTS

JP 2002-181630 A 6/2002
JP 2016-142747 A 8/2016
JP 2021-173807 A 11/2021
JP 2023-170922 A 12/2023

* cited by examiner

*Primary Examiner* — Thomas S Giampaolo, II
(74) *Attorney, Agent, or Firm* — XSENSUS LLP

(57) ABSTRACT

A fixing device includes a belt and a holder that holds a heater. A conductive member contacts an inner face of the belt and pivots. The conductive member includes one end portion in a rotation direction of the belt and an opposed portion that abuts on the one end portion. A support supports the holder and presses the conductive member against the holder. The holder includes a holding portion that holds the one end portion of the conductive member, a pivot restrictor that restricts pivoting of the conductive member about the one end portion, and a mount face from which the pivot restrictor projects in a projecting direction. The pivot restrictor projects farther than the opposed portion of the conductive member in the projecting direction of the pivot restrictor in a state in which the support does not press the conductive member against the holder.

16 Claims, 19 Drawing Sheets

FIXING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-005895, filed on Jan. 18, 2023, in the Japan Patent Office, the entire disclosure of which is hereby incorporated by reference herein.

BACKGROUND

Technical Field

Embodiments of this disclosure relate to a fixing device and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

For example, an image forming apparatus includes a fixing device including a fixing belt and a heater that heats the fixing belt. The heater includes a base, a resistive heat generator mounted on the base, and an insulating layer. As the resistive heat generator is applied with an alternating current (AC) voltage, the resistive heat generator generates heat, thus heating an inner circumferential face of the fixing belt through the insulating layer and the like.

Since the heater is applied with the alternating current voltage, the insulating layer of the heater and a surface layer of the fixing belt have an equivalence that is common to a condenser. Thus, the alternating current voltage is applied to a fixing nip formed between the fixing belt and an opposed rotator disposed opposite the fixing belt through the fixing belt. The image forming apparatus has a transfer nip where an image is transferred onto a sheet. While the sheet contacts both the transfer nip and the fixing nip, the alternating current voltage is transmitted to the transfer nip through the sheet. Hence, the alternating current voltage may affect a transfer electric field generated at the transfer nip, causing uneven density of the image transferred on the sheet periodically. The uneven density of the image may cause a banding image. For example, if the sheet is used in a high-humidity environment or the sheet is thin, the sheet has low resistance and generation of the banding image becomes more pronounced.

SUMMARY

This specification describes below an improved fixing device. In one embodiment, the fixing device includes a belt that rotates in a rotation direction and a heater that heats the belt. A holder holds the heater. A conductive member contacts an inner face of the belt. The conductive member pivots. The conductive member includes one end portion in the rotation direction of the belt and an opposed portion that abuts on the one end portion. A support supports the holder and presses the conductive member against the holder. The holder includes a holding portion that holds the one end portion of the conductive member, a pivot restrictor that restricts pivoting of the conductive member about the one end portion, and a mount face from which the pivot restrictor projects in a projecting direction. The pivot restrictor projects farther than the opposed portion of the conductive member in the projecting direction of the pivot restrictor in a state in which the support does not press the conductive member against the holder.

This specification further describes an improved fixing device. In one embodiment, the fixing device includes a belt that rotates in a rotation direction and an opposed rotator that is disposed opposite the belt. A heater heats one of the belt and the opposed rotator. A nip formation pad contacts an inner face of the belt to form a nip between the belt and the opposed rotator. A conductive member contacts the inner face of the belt. The conductive member includes one end portion in the rotation direction of the belt and an opposed portion that abuts on the one end portion. A support supports the nip formation pad and presses the conductive member against the nip formation pad. A holding portion holds the one end portion of the conductive member. A pivot restrictor restricts pivoting of the conductive member about the one end portion. The pivot restrictor projects from a mount face in a projecting direction. The pivot restrictor projects farther than the opposed portion of the conductive member in the projecting direction of the pivot restrictor in a state in which the support does not press the conductive member against the nip formation pad.

This specification further describes an improved image forming apparatus. In one embodiment, the image forming apparatus includes a transfer roller that contacts a recording medium and the fixing device described above that is disposed downstream from the transfer roller in a recording medium conveyance direction and contacts the recording medium.

BRIEF DESCRIPTION OF THE DRAWINGS

Amore complete appreciation of embodiments of the present disclosure and many of the attendant advantages and features thereof can be readily obtained and understood from the following detailed description with reference to the accompanying drawings, wherein.

Figure 1:
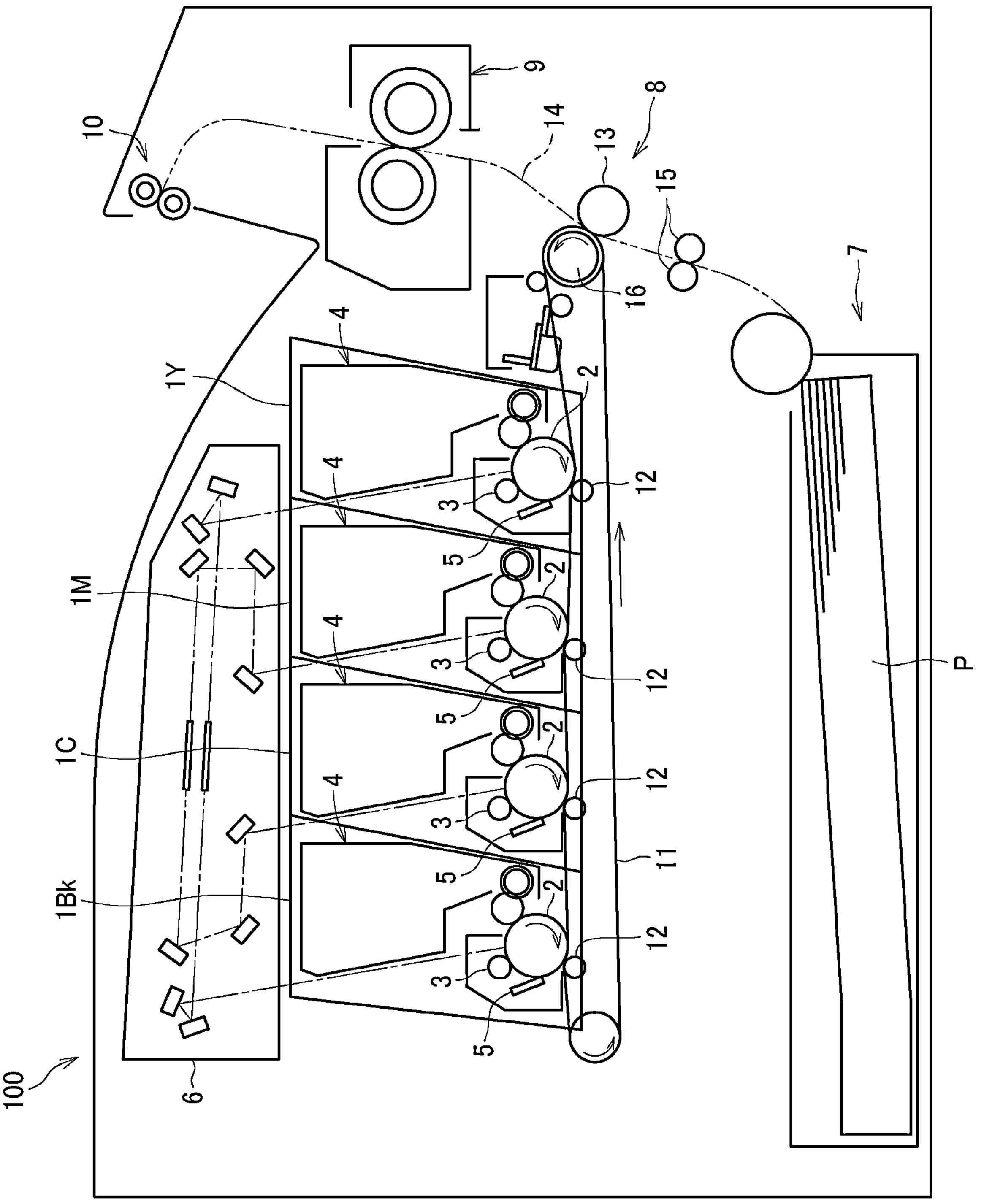
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to attached drawings, the following describes embodiments of the present disclosure. In the drawings, identical reference numerals are assigned to elements that are identical or equivalent and redundant descriptions of the elements are simplified or omitted properly.

FIG. 1 is a schematic cross-sectional view of an image forming apparatus 100 according to an embodiment of the present disclosure.

As illustrated in FIG. 1, the image forming apparatus 100 includes four image forming units 1Y, 1M, 1C, and 1Bk that are installed in an apparatus body of the image forming apparatus 100 such that the image forming units 1Y, 1M, 1C, and 1Bk are attached to and removed from the apparatus body of the image forming apparatus 100. The image forming units 1Y, 1M, 1C, and 1Bk have a similar construction. However, the image forming units 1Y, 1M, 1C, and 1Bk contain developers in different colors, that is, yellow, magenta, cyan, and black, respectively. The developers correspond to color separation components for a color image. Each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9 serving as a heating device, and an output device 10. The exposure device 6 exposes the surface of each of the photoconductors 2 and forms an electrostatic latent image thereon. The image forming apparatus 100 further includes a sheet conveyance path 14. The sheet feeder 7 supplies a sheet P serving as a recording medium to the sheet conveyance path 14. The transfer device 8 transfers the toner image formed on each of the photoconductors 2 onto the sheet P. The fixing device 9 fixes the toner image transferred onto a surface of the sheet P thereon. The output device 10 ejects the sheet P onto an outside of the image forming apparatus 100. Each of the image forming units 1Y, 1M, 1C, and 1Bk, that includes the photoconductor 2 and the charger 3, the exposure device 6, the transfer device 8, and the like construct an image forming device that forms the toner image on the sheet P.

The transfer device 8 includes an intermediate transfer belt 11, four primary transfer rollers 12, and a secondary transfer roller 13. The intermediate transfer belt 11 is an endless belt serving as an intermediate transferor. The primary transfer rollers 12 serve as primary transferors. The secondary transfer roller 13 serves as a secondary transferor. The intermediate transfer belt 11 is stretched taut across a plurality of rollers. The primary transfer rollers 12 transfer yellow, magenta, cyan, and black toner images formed on the photoconductors 2 onto the intermediate transfer belt 11, respectively, thus forming a full color toner image on the intermediate transfer belt 11. The secondary transfer roller 13 transfers the full color toner image formed on the intermediate transfer belt 11 onto the sheet P. The plurality of primary transfer rollers 12 is pressed against the photoconductors 2, respectively, via the intermediate transfer belt 11. Accordingly, the intermediate transfer belt 11 contacts each of the photoconductors 2, forming a primary transfer nip therebetween. On the other hand, the secondary transfer roller 13 is pressed against a secondary transfer opposed roller 16, that is, one of the plurality of rollers across which the intermediate transfer belt 11 is stretched taut, via the intermediate transfer belt 11. Thus, a secondary transfer nip is formed between the secondary transfer roller 13 and the intermediate transfer belt 11.

The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100.

When the image forming apparatus 100 receives an instruction to start printing, a driver disposed inside the apparatus body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon.

The toner images formed on the photoconductors 2 move and reach the primary transfer nips defined by the primary transfer rollers 12 in accordance with rotation of the photoconductors 2, respectively. The primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. The full color toner image formed on the intermediate transfer belt 11 is conveyed to the secondary transfer nip defined by the secondary transfer roller 13 in accordance with rotation of the intermediate transfer belt 11. The secondary transfer roller 13 transfers the full color toner image onto a sheet P conveyed through the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9.

Figure 2:
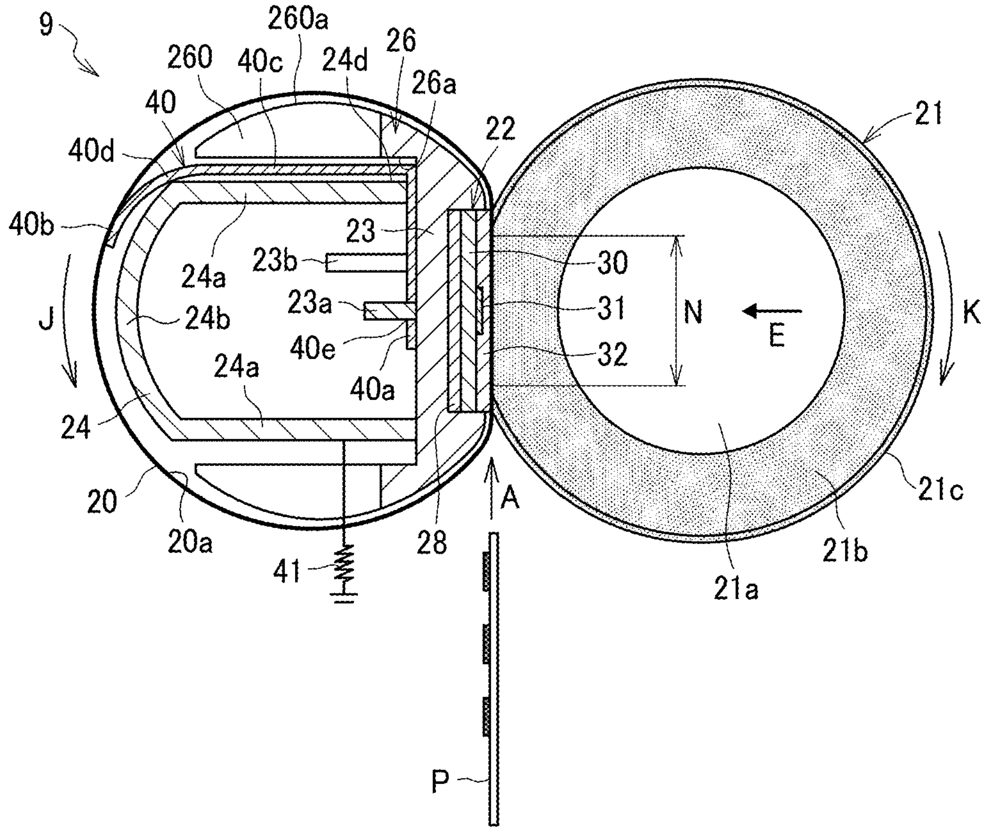
FIG. 2 is a schematic side cross-sectional view of a fixing device according to an embodiment of the present disclosure, that is incorporated in the image forming apparatus depicted in FIG. 1.
Figure 14:
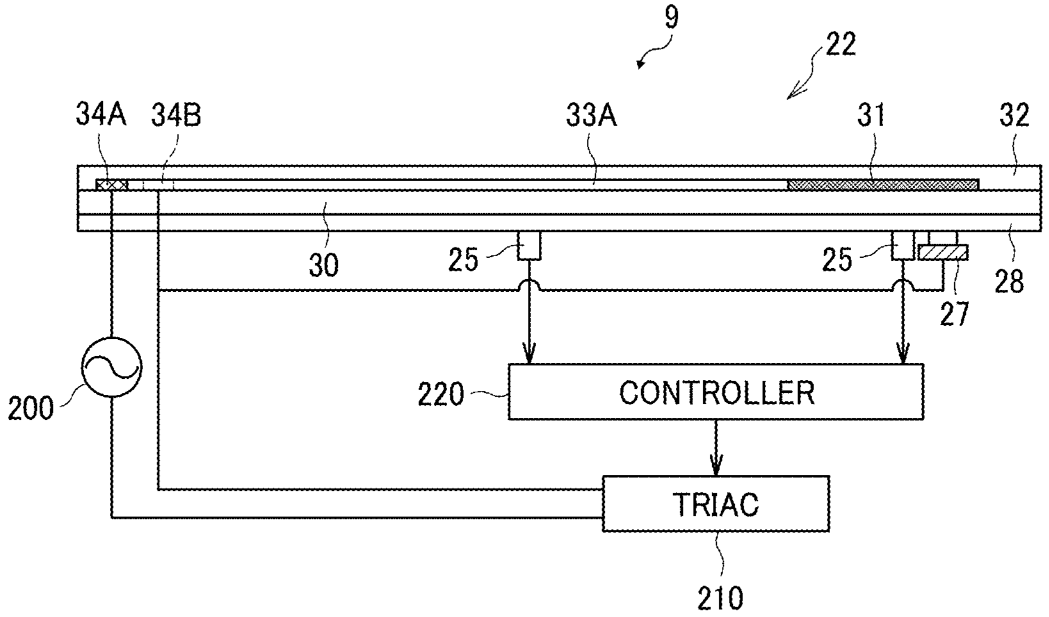
FIG. 14 is a diagram of a power supply circuit that supplies power to the heater depicted in FIG. 13.

As illustrated in FIG. 2, the fixing device 9 according to the embodiment includes a fixing belt 20, a pressure roller 21, a heater 22, a heater holder 23, a stay 24, thermistors 25 depicted in FIG. 14, a first thermal conductor 28, and a conductive member 40. The fixing belt 20 serves as a belt or a fixing rotator. The pressure roller 21 serves as an opposed rotator or a pressure rotator. The heater holder 23 serves as a holder. The stay 24 serves as a support. The thermistors 25 serve as temperature detectors. The fixing belt 20 is an endless belt. The pressure roller 21 contacts an outer circumferential face of the fixing belt 20 to form a fixing nip N between the fixing belt 20 and the pressure roller 21. The heater 22 heats the fixing belt 20. The heater holder 23 holds or supports the heater 22. The stay 24 supports the heater holder 23. Each of the thermistors 25 detects a temperature of the first thermal conductor 28.

The fixing belt 20, the pressure roller 21, the heater 22, the heater holder 23, the stay 24, the first thermal conductor 28, and the like extend in a longitudinal direction that is perpendicular to a paper surface in FIG. 2. The longitudinal direction defines a longitudinal direction X that is bidirectional and illustrated in FIGS. 4 and 13, for example. The longitudinal direction X is parallel to a width direction of a sheet P conveyed through the fixing nip N, a belt width direction of the fixing belt 20, and an axial direction of the pressure roller 21. As the fixing belt 20 and the pressure roller 21 rotate in rotation directions J and K, respectively, the fixing belt 20 and the pressure roller 21 convey the sheet P in a sheet conveyance direction A. The fixing nip N defines an upstream portion (e.g., a lower portion in FIG. 2) of the fixing device 9, that is disposed upstream from the fixing nip N, and a downstream portion (e.g., an upper portion in FIG. 2) of the fixing device 9, that is disposed downstream from the fixing nip N, in the sheet conveyance direction A.

The fixing belt 20 includes a base layer, as a tubular base, that is made of polyimide (PI) and has an outer diameter of 25 mm and a thickness in a range of from 40 μm to 120 μm, for example. The fixing belt 20 further includes a release layer serving as an outermost surface layer. The release layer is made of fluororesin, such as perfluoroalkoxy alkane (PFA) and polytetrafluoroethylene (PTFE), and has a thickness in a range of from 5 μm to 50 μm to enhance durability of the fixing belt 20 and facilitate separation of the sheet P and a foreign substance from the fixing belt 20. Optionally, an elastic layer that is made of rubber or the like and has a thickness in a range of from 50 μm to 500 μm may be interposed between the base layer and the release layer. According to the embodiment, the fixing belt 20 is a rubber-less belt that does not include the elastic layer. The base layer of the fixing belt 20 may be made of heat-resistant resin such as polyetheretherketone (PEEK) or metal such as nickel (Ni) and stainless used steel (SUS), instead of polyimide. The fixing belt 20 may include an inner circumferential face 20*a* that is coated with polyimide, PTFE, or the like to produce a sliding layer.

The pressure roller 21 has an outer diameter of 25 mm, for example. The pressure roller 21 includes a core metal 21*a*, an elastic layer 21*b* disposed on a surface of the core metal 21*a*, and a release layer 21*c* disposed on an outer surface of the elastic layer 21*b*. The core metal 21*a* is solid and made of iron. The elastic layer 21*b* is made of silicone rubber and has a thickness of 3.5 mm, for example. In order to enhance separation of the sheet P from the pressure roller 21, the elastic layer 21*b* is preferably coated with the release layer 21*c* that is made of fluororesin and has a thickness of approximately 40 μm, for example.

The fixing device 9 further includes a biasing member that biases and moves the pressure roller 21 toward the fixing belt 20, pressing the pressure roller 21 against the heater 22 via the fixing belt 20. Thus, the fixing nip N serving as a nip is formed between the fixing belt 20 and the pressure roller 21. The fixing device 9 further includes a driver that drives and rotates the pressure roller 21. As the pressure roller 21 rotates in the rotation direction K, the pressure roller 21 drives and rotates the fixing belt 20 in the rotation direction J.

The heater 22 contacts the inner circumferential face 20*a* of the fixing belt 20. According to the embodiment, the heater 22 presses against the pressure roller 21 via the fixing belt 20, thus serving as a nip formation pad that forms the fixing nip N between the fixing belt 20 and the pressure roller 21. The fixing belt 20 also serves as a heated member that is heated by the heater 22. According to the embodiment, the heater 22 contacts the inner circumferential face 20*a* of the fixing belt 20 directly. Alternatively, the heater 22 may be disposed opposite the fixing belt 20 indirectly via an element.

The heater 22 is a laminated heater that extends in the longitudinal direction thereof throughout an entire span of the fixing belt 20 in the longitudinal direction thereof. The heater 22 includes a base 30 (e.g., a substrate) that is platy, resistive heat generators 31 that are disposed on the base 30, and an insulating layer 32 that coats the resistive heat generators 31. The image forming apparatus 100 further includes a power supply 200 illustrated in FIG. 14. As the power supply 200 applies an alternating current (AC) voltage to the heater 22, the resistive heat generators 31 generate heat mainly, heating the fixing belt 20.

The insulating layer 32 of the heater 22 contacts the inner circumferential face 20*a* of the fixing belt 20. The resistive heat generators 31 generate heat that is conducted to the fixing belt 20 through the insulating layer 32. According to the embodiment, the resistive heat generators 31 and the insulating layer 32 are mounted on a fixing belt opposed face of the base 30, that is disposed opposite the fixing belt 20 and the fixing nip N. Alternatively, the resistive heat generators 31 and the insulating layer 32 may be mounted on a heater holder opposed face of the base 30, that is disposed opposite the heater holder 23. In this case, heat generated by the resistive heat generators 31 is conducted to the fixing belt 20 through the base 30. Hence, the base 30 is preferably made of a material having an enhanced thermal conductivity, such as aluminum nitride. Since the base 30 is made of the material having the enhanced thermal conductivity, even if the resistive heat generators 31 are disposed opposite the fixing belt 20 via the base 30, the resistive heat generators 31 heat the fixing belt 20 sufficiently.

The heater holder 23 and the stay 24 are disposed within a loop formed by the fixing belt 20. The stay 24 includes a channel made of metal. The stay 24 has both lateral ends in the longitudinal direction thereof, that are supported by side plates of the fixing device 9, respectively. Since the stay 24 supports the heater holder 23 and the heater 22, in a state in which the pressure roller 21 is pressed against the fixing belt 20, the heater 22 receives pressure from the pressure roller 21 precisely. Thus, the fixing nip N is formed between the fixing belt 20 and the pressure roller 21 stably. According to the embodiment, the heater holder 23 has a thermal conductivity that is smaller than a thermal conductivity of the base 30.

The stay 24 includes a base 24*b* and arms 24*a* that serve as walls and project from an upstream part and a downstream part of the base 24*b*, respectively, in the sheet conveyance direction A. The arms 24*a* are perpendicular to the base 24*b*. Thus, the stay 24 is substantially U-shaped. Each of the arms 24*a* has an end face that contacts and supports the heater holder 23. The arms 24*a* extend in a horizontal direction in FIG. 2, that is, a pressing direction E in which the pressure roller 21 is pressed against the fixing belt 20. The stay 24 is grounded through a resistance 41.

According to the embodiment, the arms 24*a* of the stay 24, that is, extended portions that extend in the pressing direction E of the pressure roller 21 (e.g., the horizontal direction in FIG. 2) or portions that have an increased thickness, contact the heater holder 23 rightward in FIG. 2 and press against the pressure roller 21 via the heater holder 23, the heater 22, and the fixing belt 20. Thus, the stay 24 supports the heater holder 23. Accordingly, the stay 24 prevents the heater holder 23 from being bent by pressure from the pressure roller 21. According to the embodiment, the stay 24 prevents bending of the heater holder 23 in the longitudinal direction thereof. The stay 24 may contact the heater holder 23 directly or indirectly via an element. For example, the element is interposed between the stay 24 and the heater holder 23 in the horizontal direction in FIG. 2. At least a part of the element contacts the stay 24 and the heater holder 23. The arms 24*a* of the stay 24 may extend in a direction different from the pressing direction E of the pressure roller 21. For example, the arms 24*a* of the stay 24 may extend in an angled direction that is angled with respect to the pressing direction E of the pressure roller 21 at an angle within a predetermined range. In this case also, the stay 24 prevents the heater holder 23 from being bent by pressure from the pressure roller 21.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP) and PEEK, the heater holder 23 suppresses conduction of heat thereto from the heater 22. Accordingly, the heater 22 heats the fixing belt 20 efficiently.

Figure 21:
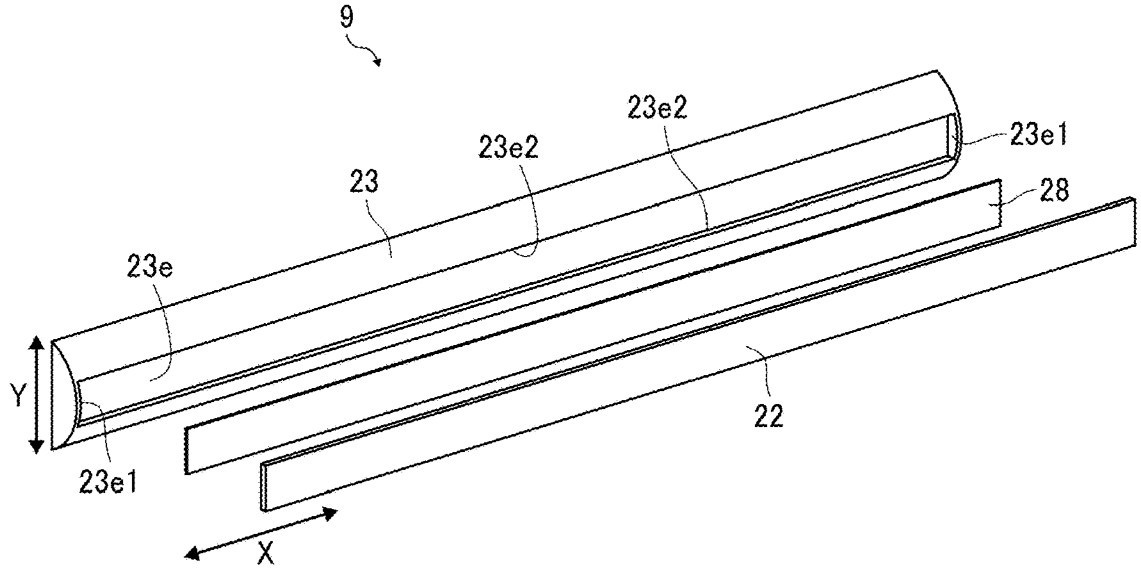
FIG. 21 is a perspective view of the heater, a first thermal conductor, and the heater holder incorporated in the fixing device depicted in FIG. 2.

The heater holder 23 includes a recess 23*e* illustrated in FIG. 21 that holds the first thermal conductor 28 and the heater 22.

As illustrated in FIG. 2, the heater holder 23 includes a guide 26 that guides the fixing belt 20. The heater holder 23 and the guide 26 are molded into a unit. The guide 26 is disposed at each of an upstream part and a downstream part of the heater holder 23 in the sheet conveyance direction A.

The guide 26 includes a plurality of guide ribs 260 serving as guides. The guide rib 260 is substantially fan-shaped. The guide rib 260 includes a guide face 260*a* that is curved along the inner circumferential face 20*a* of the fixing belt 20. The guide face 260*a* defines an arc or a projecting curved face that extends in a circumferential direction of the fixing belt 20.

The first thermal conductor 28 is made of a material having a thermal conductivity greater than a thermal conductivity of the base 30. According to the embodiment, the first thermal conductor 28 is a plate made of aluminum. Alternatively, the first thermal conductor 28 may be made of copper, silver, graphene, or graphite, for example. Since the first thermal conductor 28 is platy, the first thermal conductor 28 improves accuracy of positioning of the heater 22 with respect to the heater holder 23 and the first thermal conductor 28.

A description is provided of a method for calculating the thermal conductivity described above.

A thermal diffusivity of a target object was measured and a thermal conductivity was calculated based on the thermal diffusivity.

The thermal diffusivity was measured with a thermal diffusivity-thermal conductivity measurement device, ai-Phase Mobile 1u, manufactured by ai-Phase Co., Ltd.

The thermal diffusivity was converted into the thermal conductivity based on a density and a specific heat capacity. The density was measured with a dry-process pycnometer, Accupyc 1330, manufactured by Shimadzu Corporation. The specific heat capacity was measured with a differential scanning calorimeter, DSC-60, manufactured by Shimadzu Corporation. Sapphire was used as a reference material having a known specific heat capacity. According to an embodiment, the specific heat capacity was measured five times to obtain an average at 50 degrees Celsius. Based on a density ρ, a specific heat capacity S, and a thermal diffusivity a obtained by the above-described measurement of the thermal diffusivity, a thermal conductivity λ is obtained by a formula (1) below.

$$\lambda = \rho \times S \times \alpha \tag{1}$$

In the fixing device 9 according to the embodiment, when printing starts, the driver drives and rotates the pressure roller 21 and the fixing belt 20 starts rotation in accordance with rotation of the pressure roller 21. Since the inner circumferential face 20*a* of the fixing belt 20 is contacted and guided by the guide face 260*a* of the guide rib 260, the fixing belt 20 rotates stably and smoothly. Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure.

Figure 3:
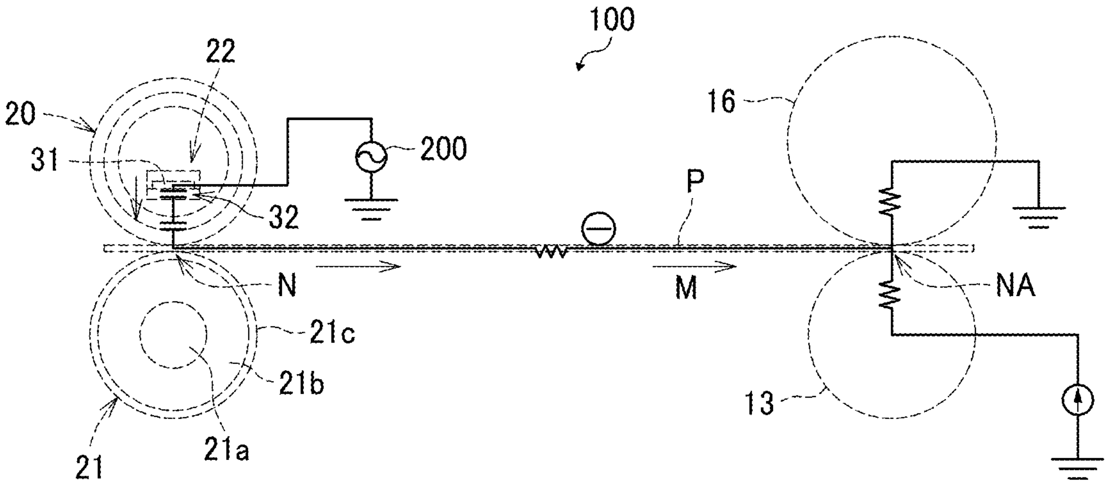
FIG. 3 is a diagram of the image forming apparatus depicted in FIG. 1, illustrating a construction that may cause a banding image.

The fixing device 9 may cause a banding image. For example, since the fixing device 9 incorporates the heater 22 that is applied with an alternating current voltage, the insulating layer 32 of the heater 22 and the release layer as the outermost surface layer of the fixing belt 20 have an equivalence that is common to a condenser. As the heater 22 contacts the fixing belt 20, the alternating current voltage is applied to the fixing nip N through the fixing belt 20. As illustrated in FIG. 3, in a state in which the sheet P contacts both the fixing nip N and a secondary transfer nip NA formed between the secondary transfer roller 13 and the secondary transfer opposed roller 16, the alternating current voltage is transmitted to the secondary transfer nip NA in a transmission direction M through the sheet P. The alternating current voltage may affect a transfer electric field, causing periodic, uneven density of a toner image transferred onto the sheet P, that is, a banding image. For example, if the sheet P is used in a high-humidity environment or the sheet P is thin, the sheet P has low resistance and generation of the banding image becomes more pronounced. The secondary transfer nip NA is a nip formed between the secondary transfer roller 13 and the secondary transfer opposed roller 16.

The fixing device 9 may form a faulty toner image due to electrostatic offset. For example, while the sheet P is conveyed through the fixing nip N, unfixed toner of the toner image on the sheet P is attracted and adhered to the charged release layer as the outermost surface layer of the fixing belt 20. As the fixing belt 20 rotates, the toner adhered to the fixing belt 20 moves to the fixing nip N again and adheres to a subsequent sheet P that reaches the fixing nip N subsequently, forming a faulty toner image on the subsequent sheet P.

A description is provided of a construction of a comparative fixing device that addresses formation of the faulty toner image.

The comparative fixing device includes a fixing belt and a conductive member that contacts an inner face of the fixing belt. An electric current is released to ground through the conductive member. For example, the comparative fixing device further includes a heater holder that includes a projection. The projection is inserted into a hole disposed at one end of the conductive member such that the projection does not move off from the hole. Another end of the conductive member contacts the inner face of the fixing belt (e.g., a heating film).

However, the conductive member may pivot in a direction perpendicular to an attachment direction of the conductive member, thus being displaced from a proper position. Accordingly, the comparative fixing device may suffer from an increased number of assembly processes. The conductive member may contact the fixing belt faultily and may not achieve proper discharging.

To address formation of the faulty toner image, according to the embodiment of the present disclosure, the fixing device 9 depicted in FIG. 2 includes the conductive member 40 that releases the alternating current voltage to ground from the fixing nip N through the fixing belt 20. Thus, the fixing device 9 prevents formation of the banding image. The conductive member 40 removes electric charge from a surface of the fixing belt 20, preventing formation of the faulty toner image due to the electrostatic offset.

As illustrated in FIG. 2, the conductive member 40 is a flexible sheet. The conductive member 40 is made of a conductive material. According to the embodiment, the conductive member 40 is made of conductive polyimide added with carbon black. The conductive member 40 is grounded through the stay 24 and the resistance 41. The fixing device 9 may incorporate a plurality of conductive members 40 arranged in the longitudinal direction of the fixing belt 20 or a single conductive member 40. The conductive member 40 is interposed between the stay 24 and the guide 26.

Figure 5:
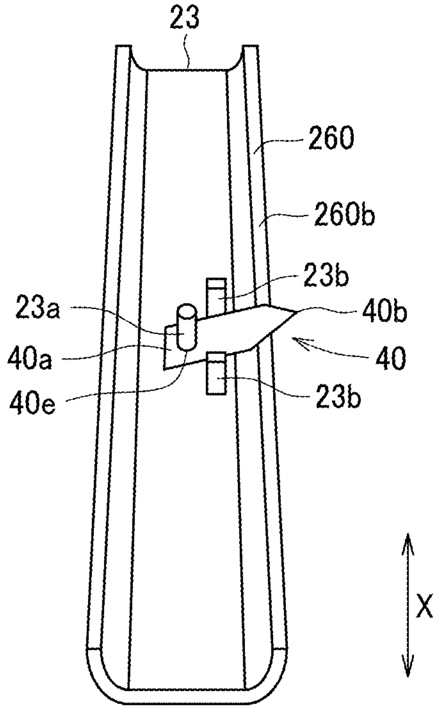
FIG. 5 is a perspective view of the heater holder depicted in FIG. 4, after the conductive member is attached to the heater holder.

The conductive member 40 includes a fixed end 40*a* serving as one end and a free end 40*b* serving as another end. The free end 40*b* serves as a contact portion that contacts an inner face (e.g., the inner circumferential face 20*a*) of the fixing belt 20. As the free end 40*b* contacts the inner circumferential face 20*a* of the fixing belt 20, the conductive member 40 releases the electric charge on the surface of the fixing belt 20 to ground through the stay 24 and the resistance 41, thus removing the electric charge accumulated on the surface of the fixing belt 20. According to the embodiment, the free end 40*b* (e.g., another end) of the conductive member 40 is opposite to the fixed end 40*a* (e.g., one end) of the conductive member 40. The free end 40*b* as another end is opposite to the fixed end 40*a* as one end via a center position of the conductive member 40 in an orthogonal direction perpendicular to a width direction of the conductive member 40. The orthogonal direction extends along a face of the conductive member 40. In other words, in a state in which the conductive member 40 is not bent and is substantially sheet-shaped, the free end 40*b* as another end is opposite to the fixed end 40*a* as one end via a position equivalent to the center position of the conductive member 40 in the orthogonal direction that is perpendicular to the width direction of the conductive member 40 and is extended along the face of the conductive member 40. The conductive member 40 may include a tip disposed in the free end 40*b* as illustrated in FIG. 5 or may be rectangular.

The conductive member 40 includes an opposed portion 40*c* that is disposed opposite a first opposed face 24*d* of the stay 24 and a second opposed face 26*a* of the guide 26. The first opposed face 24*d* and the second opposed face 26*a* restrict inclination of the conductive member 40. For example, the first opposed face 24*d* and the second opposed face 26*a* are disposed at positions where the first opposed face 24*d* and the second opposed face 26*a* contact the conductive member 40 and restrict inclination of the conductive member 40 when the conductive member 40 tilts upward or downward in FIG. 2.

The conductive member 40 includes a bent portion 40*d* that abuts on the free end 40*b*. The free end 40*b* is bent downstream from the bent portion 40*d* in the rotation direction J of the fixing belt 20.

The fixed end 40*a* of the conductive member 40 abuts on the opposed portion 40*c* and is bent from the opposed portion 40*c*. The fixed end 40*a* that is opposite to the free end 40*b* via the opposed portion 40*c* is sandwiched between the arm 24*a* of the stay 24 and the heater holder 23 in the horizontal direction in FIG. 2. Thus, pressure from the pressure roller 21 causes the conductive member 40 to be sandwiched between the stay 24 and the heater holder 23. Accordingly, the conductive member 40 contacts the stay 24 precisely and is grounded through the stay 24.

Figure 4:
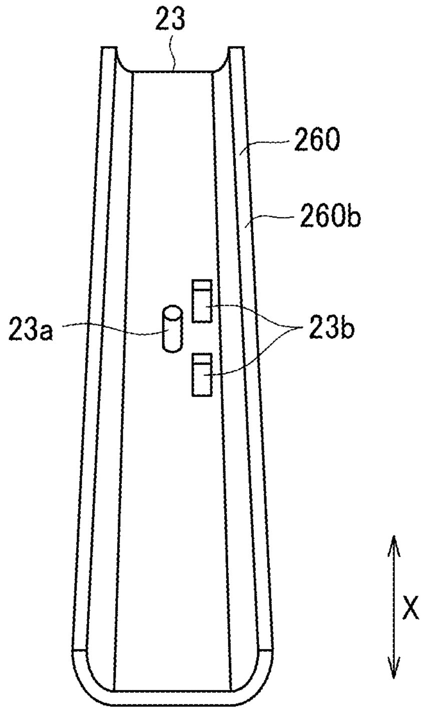
FIG. 4 is a perspective view of a heater holder incorporated in the fixing device depicted in FIG. 2, before a conductive member is attached to the heater holder.

Referring to FIGS. 4 and 5, a description is provided of a holding construction in which the heater holder 23 holds the conductive member 40.

As illustrated in FIG. 4, the heater holder 23 includes a positioning pin 23*a* serving as a holding portion and two pivot restricting ribs 23*b* serving as pivot restrictors that are mounted on a stay opposed face of the heater holder 23, that is disposed opposite the stay 24. The positioning pin 23*a* is interposed between the two pivot restricting ribs 23*b*. The positioning pin 23*a* and the pivot restricting ribs 23*b* project in a projecting direction (e.g., the horizontal direction in FIG. 2) that is parallel to the pressing direction E of the pressure roller 21.

Figure 6:
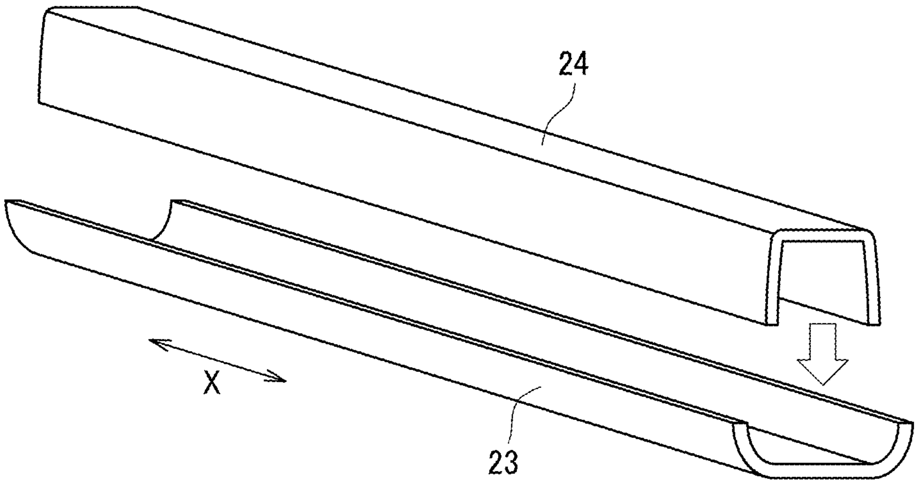
FIG. 6 is a perspective view of the heater holder depicted in FIG. 5 and a stay to be attached to the heater holder.

As illustrated in FIG. 5, the conductive member 40 further includes an insertion hole 40*e* that is disposed in the fixed end 40*a*. In order to attach the conductive member 40 to the heater holder 23, the positioning pin 23*a* is inserted into the insertion hole 40*e* so that the positioning pin 23*a* holds the conductive member 40. The free end 40*b* of the conductive member 40 is placed between the two pivot restricting ribs 23*b*. Thus, the conductive member 40 is attached to the heater holder 23. In a state in which the conductive member 40 is attached to the heater holder 23, as illustrated in FIG. 6, the stay 24 comes into contact with the heater holder 23. As illustrated in FIG. 2, the stay 24 and the heater holder 23 sandwich the fixed end 40*a* of the conductive member 40. Thus, the conductive member 40 has a sandwiched portion (e.g., the fixed end 40*a*) that is sandwiched between the stay 24 and the heater holder 23 and a non-sandwiched portion (e.g., the opposed portion 40*c*) that is not sandwiched between the stay 24 and the heater holder 23 and is disposed closer to the free end 40*b* than the sandwiched portion is.

The non-sandwiched portion projects in a direction that separates from the pressure roller 21 and extends leftward in FIG. 2 along the stay 24. The free end 40*b* of the conductive member 40 is bent from the bent portion 40*d* toward the stay 24. FIG. 6 omits illustration of the conductive member 40.

Figure 7:
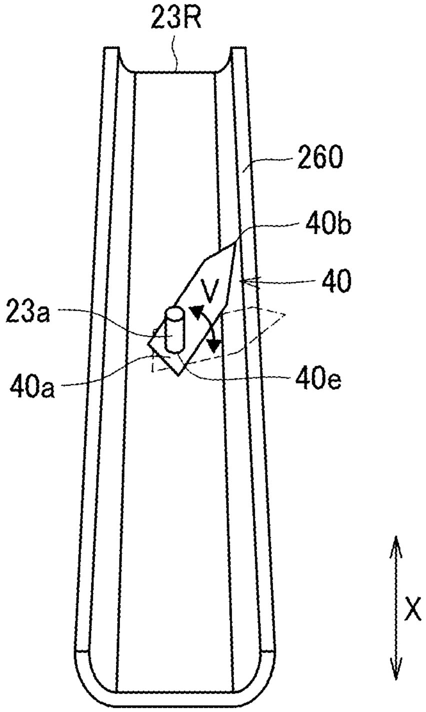
FIG. 7 is a perspective view of a heater holder that is different from the heater holder depicted in FIG. 5, illustrating the conductive member that pivots with respect to the heater holder.
Figure 8:
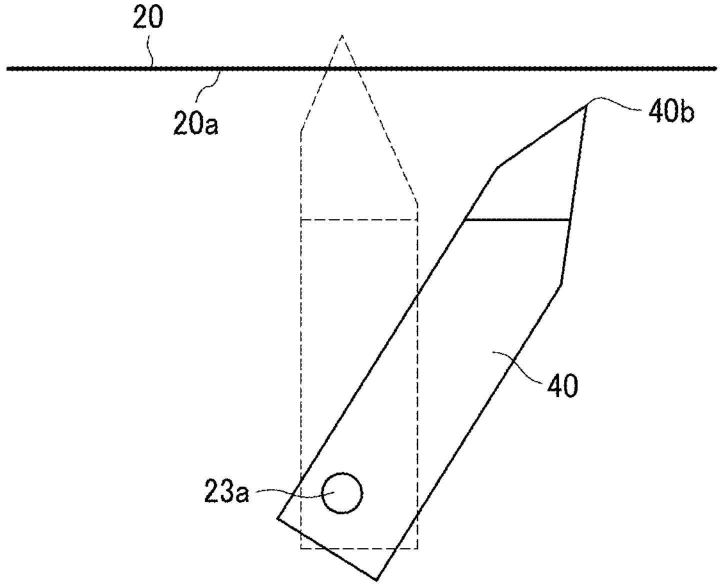
FIG. 8 is a schematic diagram of the conductive member depicted in FIG. 7 that pivots and does not contact a fixing belt incorporated in the fixing device depicted in FIG. 2.
Figure 9:
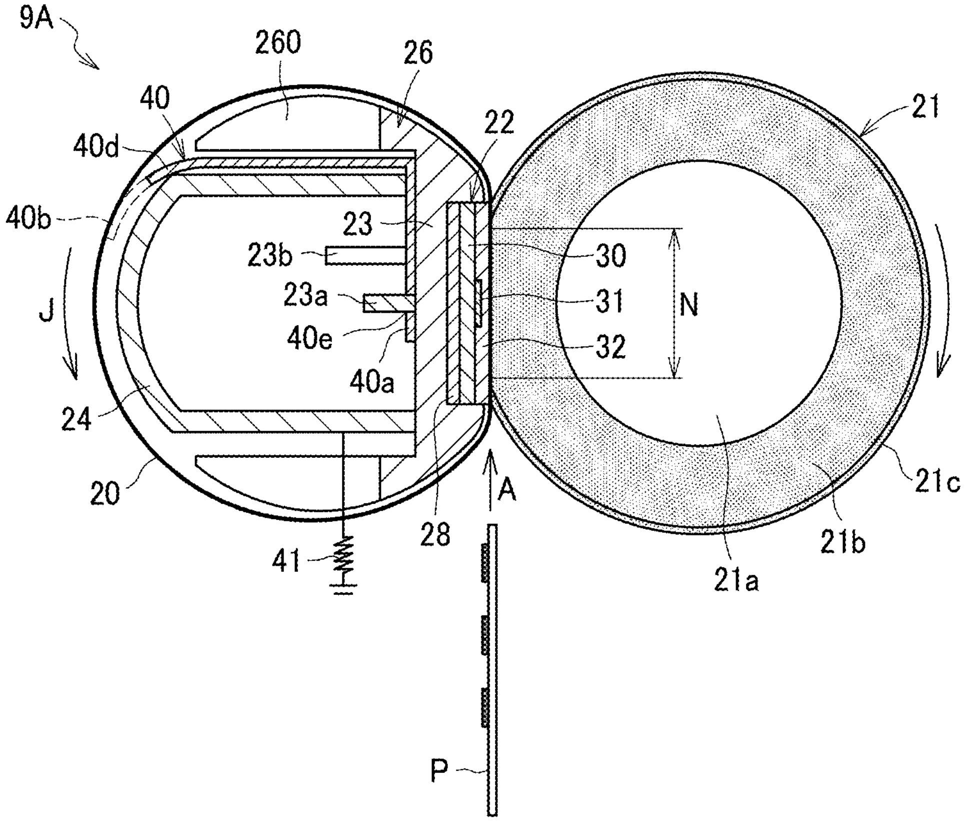
FIG. 9 is a side cross-sectional view of the conductive member depicted in FIG. 8 that pivots and does not contact the fixing belt.

As described above, the positioning pin 23*a* is inserted into the insertion hole 40*e* disposed in the fixed end 40*a* of the conductive member 40. Hence, as illustrated in FIG. 7, the conductive member 40 may pivot about the positioning pin 23*a*. FIG. 7 illustrates a heater holder 23R that includes the positioning pin 23*a* and does not include the pivot restricting ribs 23*b*. Accordingly, as illustrated with a solid line in FIGS. 8 and 9, the free end 40*b* of the conductive member 40 may not contact and discharge the inner circumferential face 20*a* of the fixing belt 20. FIGS. 8 and 9 illustrate the free end 40*b* that is to contact the inner circumferential face 20*a* of the fixing belt 20 with a broken line. FIG. 9 illustrates a fixing device 9A in which the free end 40*b* of the conductive member 40 does not contact and discharge the inner circumferential face 20*a* of the fixing belt 20.

Additionally, when the conductive member 40 is attached to the heater holder 23, extra processes for returning the conductive member 40 to a proper position and attaching the stay 24 to the heater holder 23 such that the conductive member 40 does not pivot may be added, degrading assembly of the fixing device 9A.

To address the circumstance, according to the embodiment, the heater holder 23 incorporates the pivot restricting ribs 23*b* depicted in FIG. 4 that prevent pivoting of the conductive member 40. The conductive member 40 pivots in a pivot direction V depicted in FIG. 7 that is parallel to a face perpendicular to the projecting direction of the positioning pin 23*a*. According to the embodiment, the pivot restricting ribs 23*b* are disposed opposite both lateral ends of the conductive member 40 in the longitudinal direction X of the heater holder 23, respectively, thus preventing the conductive member 40 from pivoting bidirectionally in the pivot direction V thereof.

In order to cause the pivot restricting ribs 23*b* to restrict pivoting of the conductive member 40, each of the pivot restricting ribs 23*b* has an appropriate height. The following describes the appropriate height of each of the pivot restricting ribs 23*b*.

Figure 10:
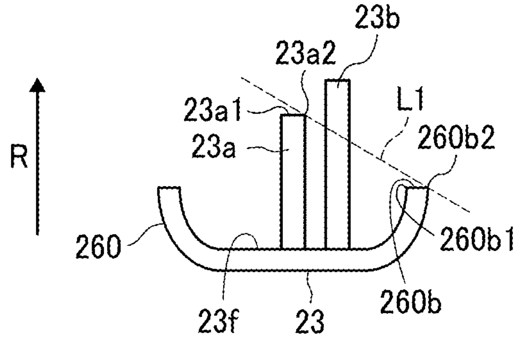
FIG. 10 is a side view of the heater holder and guide ribs incorporated in the fixing device depicted in FIG. 2, illustrating a first hypothetical line that indicates a posture of the conductive member at a highest height thereof.

In order to attach the conductive member 40 to the heater holder 23, as illustrated in FIG. 5, the positioning pin 23*a* is inserted into the insertion hole 40*e* penetrating through the fixed end 40*a* of the conductive member 40. The free end 40*b* of the conductive member 40 is placed on an end face 260*b* of the guide rib 260. The end face 260*b* serves as a mount that is placed with the conductive member 40. The conductive member 40 has a posture that varies depending on a height of the positioning pin 23*a* at which the free end 40*b* of the conductive member 40 is held. For example, as illustrated in FIG. 10, a summit 23*a*1 of the positioning pin 23*a* and the end face 260*b* of the guide rib 260 define a first hypothetical line L1 (e.g., a broken line) that indicates a posture of the conductive member 40 at a highest height thereof. In other words, on a plane perpendicular to the longitudinal direction X of the heater holder 23, the first hypothetical line L1 extends from a higher edge 23*a*2 of the positioning pin 23*a* to the end face 260*b*, serving as the mount, of the guide rib 260. The higher edge 23*a*2 of the positioning pin 23*a* is disposed opposite the pivot restricting rib 23*b*. For example, the end face 260*b* includes an inner edge 260*b*1 that is disposed opposite the pivot restricting rib 23*b* and an outer edge 260*b*2 that is disposed opposite the pivot restricting rib 23*b* via the inner edge 260*b*1. The first hypothetical line L1 connects the edge 23*a*2 of the positioning pin 23*a* to the outer edge 260*b*2 of the end face 260*b* of the guide rib 260.

Figure 11:
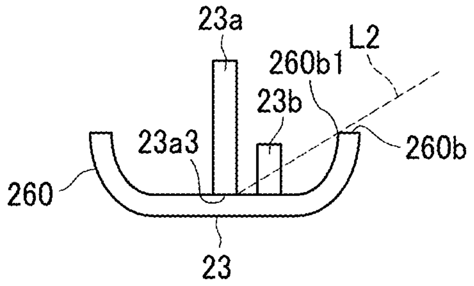
FIG. 11 is a side view of the heater holder and the guide ribs incorporated in the fixing device depicted in FIG. 2, illustrating a second hypothetical line that indicates a posture of the conductive member at a lowest height thereof.

Conversely, as illustrated in FIG. 11, a bottom face 23*a*3 of the positioning pin 23*a* and the end face 260*b* of the guide rib 260 define a second hypothetical line L2 (e.g., a broken line) that indicates a posture of the conductive member 40 at a lowest height thereof. For example, the second hypothetical line L2 connects the bottom face 23*a*3 of the positioning pin 23*a* to the inner edge 260*b*1 of the end face 260*b* of the guide rib 260.

FIGS. 10 and 11 illustrate the heater holder 23 and the guide rib 260 before the stay 24 and the fixing belt 20 are installed into the fixing device 9.

Accordingly, unless the pivot restricting rib 23*b* is higher than at least the second hypothetical line L2 depicted in FIG. 11, the pivot restricting rib 23*b* does not contact the conductive member 40 and does not restrict pivoting of the conductive member 40. If the pivot restricting rib 23*b* is higher than the first hypothetical line L1 depicted in FIG. 10, the pivot restricting rib 23*b* restricts pivoting of the conductive member 40 regardless of the posture of the conductive member 40.

As illustrated in FIG. 10, the heater holder 23 further includes a mount face 23*f* that mounts the positioning pin 23*a* serving as the holding portion. Each of the positioning pin 23*a* and the pivot restricting rib 23*b* projects from the mount face 23*f* with a height in a projecting direction R of the positioning pin 23*a* and the pivot restricting rib 23*b*. The projecting direction R is perpendicular to the mount face 23*f*. According to the embodiment, the projecting direction R is parallel to the pressing direction E of the pressure roller 21. The pivot restricting rib 23*b* is higher than the first hypothetical line L1 or the second hypothetical line L2. For example, on a plane that is perpendicular to the longitudinal direction X of the heater holder 23 depicted in FIGS. 10 and 11, in a state in which the stay 24 serving as the support is not installed in the fixing device 9, the pivot restricting rib 23*b* defines an overlap portion that overlaps the first hypothetical line L1 or the second hypothetical line L2 at a height higher than the first hypothetical line L1 or the second hypothetical line L2.

Figure 12A:
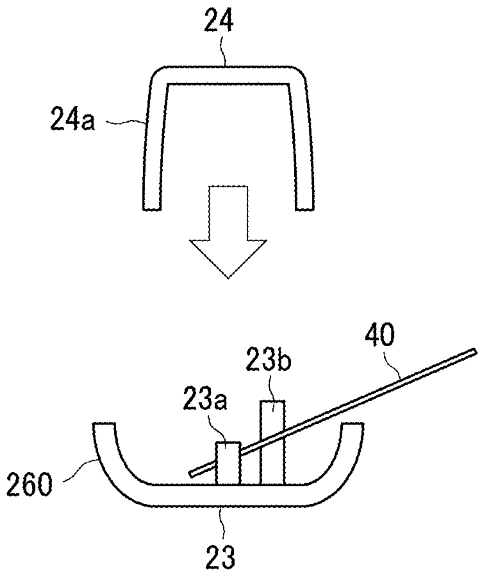
FIG. 12A is a side view of the heater holder and the stay depicted in FIG. 6 to be attached to the heater holder.
Figure 12B:
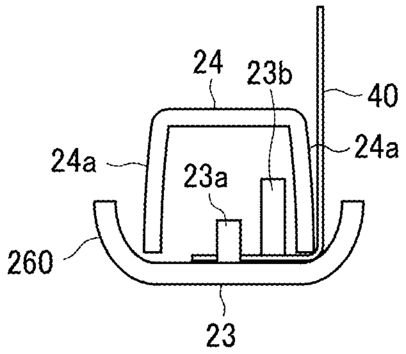
FIG. 12B is a side view of the heater holder attached with the stay depicted in FIG. 12A.

As illustrated in FIGS. 12A and 12B, in a state in which the heater holder 23 holds the conductive member 40, the stay 24 is attached to the heater holder 23. The pivot restricting rib 23*b* is interposed between the positioning pin 23*a* and one of the arms 24*a* of the stay 24. Thus, the pivot restricting rib 23*b* restricts pivoting of the conductive member 40 at a portion of the conductive member 40, that is disposed closer to the positioning pin 23*a*, than a sandwiched portion of the conductive member 40, that is sandwiched between the stay 24 and the heater holder 23, is. Accordingly, the pivot restricting rib 23*b* restricts pivoting of the fixed end 40*a* of the conductive member 40 before and after the stay 24 is attached to the heater holder 23.

The embodiment of the present disclosure is preferably applied to the fixing device 9 incorporating the fixing belt 20 made of polyimide, for example. Since the fixing belt 20 is subject to deformation, the conductive member 40 is placed inside the fixing device 9 precisely. According to the embodiment, the conductive member 40 contacts the fixing belt 20 precisely. The embodiment of the present disclosure is preferably applied to the fixing device 9 incorporating the fixing belt 20 that is made of polyimide and does not include the elastic layer. Since the fixing belt 20 is also subject to deformation similarly, with application of the embodiment of the present disclosure, the conductive member 40 contacts the fixing belt 20 precisely.

Figure 13:
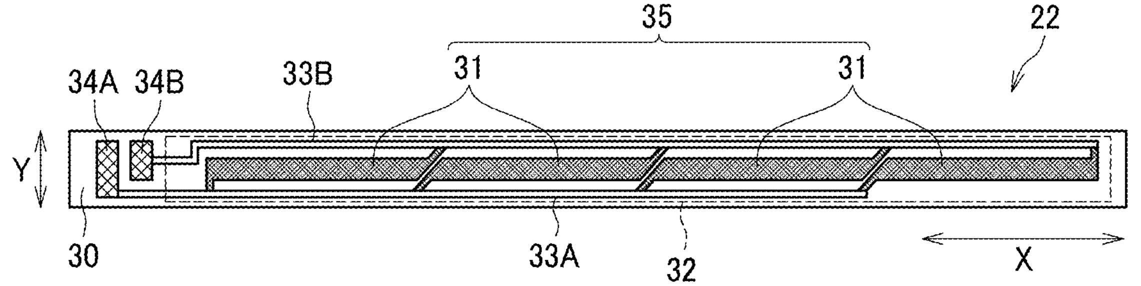
FIG. 13 is a plan view of a heater incorporated in the fixing device depicted in FIG. 2, illustrating resistive heat generators incorporated in the heater.

Referring to FIG. 13, a detailed description is provided of a construction of the heater 22 of the fixing device 9.

FIG. 13 is a plan view of the heater 22 according to the embodiment.

As illustrated in FIG. 13, the base 30 is platy and has a mount face that mounts the plurality of resistive heat generators 31 (e.g., the four resistive heat generators 31), feeders 33A and 33B serving as conductors, a first electrode 34A, and a second electrode 34B. The number of the resistive heat generators 31 is not limited to four.

FIG. 13 illustrates the longitudinal direction X of the heater 22 and the like, that is perpendicular to the paper surface in FIG. 2. The longitudinal direction X also defines an arrangement direction in which the plurality of resistive heat generators 31 is arranged. FIG. 13 illustrates an orthogonal direction Y (e.g., a vertical direction in FIG. 13) that is perpendicular to or intersects the arrangement direction of the resistive heat generators 31 and is different from a thickness direction of the base 30. The orthogonal direction Y extends along the mount face of the base 30, that mounts the resistive heat generators 31. The orthogonal direction Y is parallel to a short direction of the heater 22 or the sheet conveyance direction A in which the sheet P is conveyed through the fixing device 9.

The heater 22 includes a heat generation portion 35 that is divided into the plurality of resistive heat generators 31 arranged in the arrangement direction, that is, the longitudinal direction X of the heater 22. The resistive heat generators 31 are electrically connected in parallel to a pair of electrodes, that is, the first electrode 34A and the second electrode 34B, through the feeders 33A and 33B. The first electrode 34A and the second electrode 34B are mounted on one lateral end (e.g., a left end in FIG. 13) of the base 30 in the longitudinal direction X thereof. Each of the feeders 33A and 33B is made of a conductor having a resistance value smaller than a resistance value of the resistive heat generator 31. The adjacent resistive heat generators 31 define a gap therebetween, that is 0.2 mm or greater, preferably 0.4 mm or greater, in view of ensuring insulation between the adjacent resistive heat generators 31. If the gap between the adjacent resistive heat generators 31 is excessively great, the fixing belt 20 is subject to temperature decrease at an opposed portion thereof that is disposed opposite the gap. Hence, the gap is 5 mm or smaller, preferably 1 mm or smaller, in view of suppressing uneven temperature of the fixing belt 20 in the longitudinal direction X thereof.

The resistive heat generators 31 are made of a material having a positive temperature coefficient (PTC) property that is characterized in that the resistance value increases, that is, a heater output decreases, as the temperature increases.

Since the resistive heat generators 31 have the PTC property and the heat generation portion 35 is divided into the plurality of resistive heat generators 31 in the longitudinal direction X of the heater 22, the heater 22 prevents overheating of the fixing belt 20 when sheets P having a decreased size are conveyed over the fixing belt 20. For example, if a sheet P having a decreased width that is smaller than an entire length of the heat generation portion 35 in the longitudinal direction X of the heater 22 is conveyed through the fixing nip N, since the sheet P does not draw heat from the fixing belt 20 in an outboard span that is outboard from the sheet P in the longitudinal direction X of the fixing belt 20, the resistive heat generators 31 in the outboard span are subject to temperature increase. Since a constant voltage is applied to the resistive heat generators 31, when the temperature of the resistive heat generators 31 in the outboard span increases and the resistance value thereof increases, conversely, an output (e.g., a heat generation amount) of the resistive heat generators 31 decreases relatively, suppressing temperature increase of the resistive heat generators 31 that are disposed in both lateral end spans of the heat generation portion 35 in the longitudinal direction X thereof. Additionally, the plurality of resistive heat generators 31 is electrically connected in parallel, suppressing temperature increase in a non-conveyance span where the sheet P is not conveyed over the fixing belt 20 while the fixing device 9 retains a printing speed at which a toner image is fixed on the sheet P. Alternatively, the heat generation portion 35 may include heat generators other than the resistive heat generators 31 having the PTC property. The resistive heat generators 31 may be arranged in a plurality of columns in the orthogonal direction Y of the heater 22.

As described above, the heat generation portion 35 is divided into the resistive heat generators 31 arranged in the longitudinal direction X of the heater 22. Hence, the heater 22 suppresses temperature increase of the resistive heat generators 31 that are disposed in both lateral end spans of the heat generation portion 35 in the longitudinal direction X thereof, thus suppressing uneven temperature of the fixing belt 20 in the longitudinal direction X thereof. The fixing belt 20 has rigidity that changes as the temperature of the fixing belt 20 changes. Hence, the fixing belt 20 that decreases uneven temperature in the longitudinal direction X thereof advantageously contacts the conductive member 40 stably. Accordingly, the fixing device 9 according to the embodiment of the present disclosure employs the resistive heat generators 31 that are separated in the longitudinal direction X of the heater 22. Alternatively, the fixing device 9 may employ the first thermal conductor 28 and second thermal conductors 36 described below with reference to FIGS. 25 and 26. Thus, the conductive member 40 preferably contacts the fixing belt 20 stably.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80Ω at an ambient temperature. Alternatively, the resistive heat generator 31 may be made of a resistive material such as a silver alloy (AgPt) and ruthenium oxide ($RuO_2$). The feeders 33A and 33B, the first electrode 34A, and the second electrode 34B are made of a material prepared with silver (Ag) or silver-palladium (AgPd) by screen printing or the like. Each of the feeders 33A and 33B is made of a conductor having a resistance value smaller than a resistance value of the resistive heat generator 31.

The base 30 is preferably made of ceramics, such as alumina and aluminum nitride, or a nonmetallic material, such as glass and mica, having an enhanced heat resistance and an enhanced insulation. According to the embodiment, the base 30 is made of alumina and has a short width of 8 mm in the orthogonal direction Y, a longitudinal length of 270 mm in the longitudinal direction X, and a thickness of 1.0 mm. Alternatively, the base 30 may include a conductive layer made of metal or the like and an insulating layer disposed on the conductive layer. The metal of the base 30 is preferably aluminum, stainless steel, or the like that is available at reduced costs. The base 30 made of a stainless steel plate suppresses breakage due to thermal stress. In order to improve evenness of heat conducted from the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33A and 33B and insulates and protects the resistive heat generators 31 and the feeders 33A and 33B. Additionally, the insulating layer 32 retains sliding of the fixing belt 20 over the heater 22.

FIG. 14 is a diagram of the heater 22 according to the embodiment, illustrating a power supply circuit that supplies power to the heater 22.

As illustrated in FIG. 14, according to the embodiment, the power supply circuit for supplying power to the resistive heat generators 31 includes the alternating current power supply 200 that is electrically connected to the first electrode 34A and the second electrode 34B of the heater 22. The power supply circuit further includes a triac 210 that controls an amount of power supplied to the resistive heat generators 31. The power supply circuit further includes a controller 220 that controls the amount of power supplied to each of the resistive heat generators 31 through the triac 210 based on temperatures of the resistive heat generators 31, that are detected by the thermistors 25, respectively. The controller 220 includes a microcomputer that includes a central processing unit (CPU), a read only memory (ROM), a random access memory (RAM), and an input-output (I/O) interface.

According to the embodiment, the thermistors 25 are disposed opposite a center span of the heater 22 in the longitudinal direction X thereof, that is, a minimum sheet conveyance span where a minimum size sheet P available in the fixing device 9 is conveyed, and one lateral end span of the heater 22 in the longitudinal direction X thereof, respectively. The fixing device 9 further includes a thermostat 27 that is disposed opposite one lateral end span of the heater 22 in the longitudinal direction X thereof. The thermostat 27 serves as a power breaker that interrupts supplying power to the resistive heat generators 31 when a temperature of the resistive heat generator 31 is a predetermined temperature or higher. The thermistors 25 and the thermostat 27 contact the first thermal conductor 28 to detect a temperature of the first thermal conductor 28.

Figure 15:
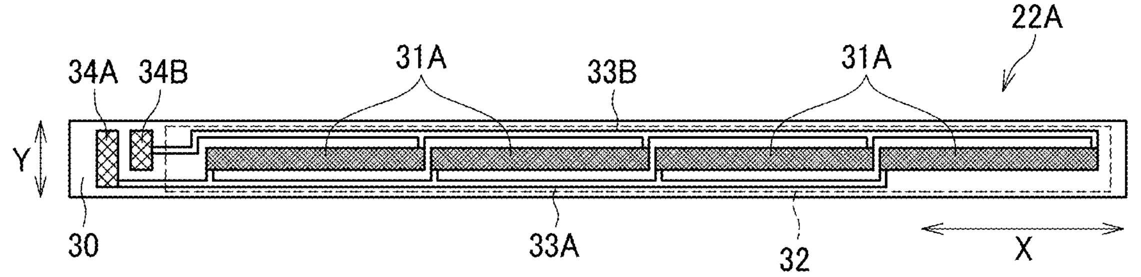
FIG. 15 is a plan view of a heater including resistive heat generators having a shape that is different from a shape of the resistive heat generators of the heater depicted in FIG. 13.
Figure 16:
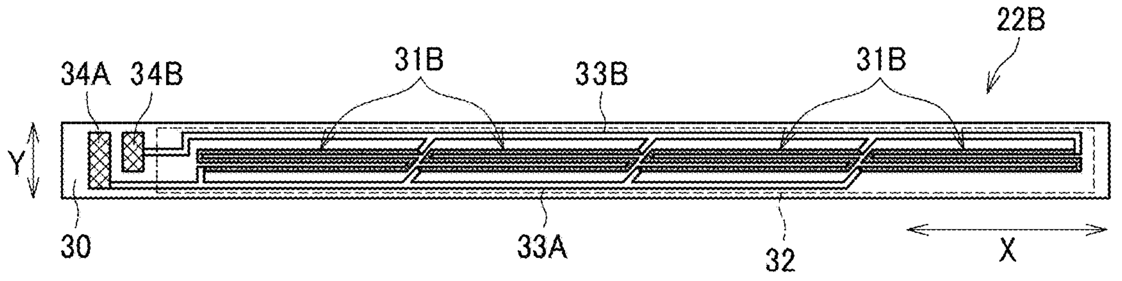
FIG. 16 is a plan view of a heater including resistive heat generators having a shape that is different from the shapes of the resistive heat generators of the heaters depicted in FIGS. 13 and 15.

According to the embodiment, the first electrode 34A and the second electrode 34B are disposed in an identical lateral end span of the heater 22 in the longitudinal direction X thereof. Alternatively, the first electrode 34A and the second electrode 34B may be disposed in one lateral end span and another lateral end span of the heater 22 in the longitudinal direction X thereof, respectively. The resistive heat generator 31 may have shapes that are not limited to a shape according to the embodiment. For example, FIG. 15 illustrates a heater 22A that includes resistive heat generators 31A each of which is rectangular. FIG. 16 illustrates a heater 22B that includes resistive heat generators 31B each of which includes a linear portion. The linear portion turns to define a parallelogram substantially. As illustrated in FIG. 15, the heater 22A includes an extension that extends from the resistive heat generator 31A having a block shape to the feeder 33A or 33B in the orthogonal direction Y The extension may be a part of the resistive heat generator 31A or may be made of a material equivalent to a material of the feeder 33A or 33B.

Figure 17:
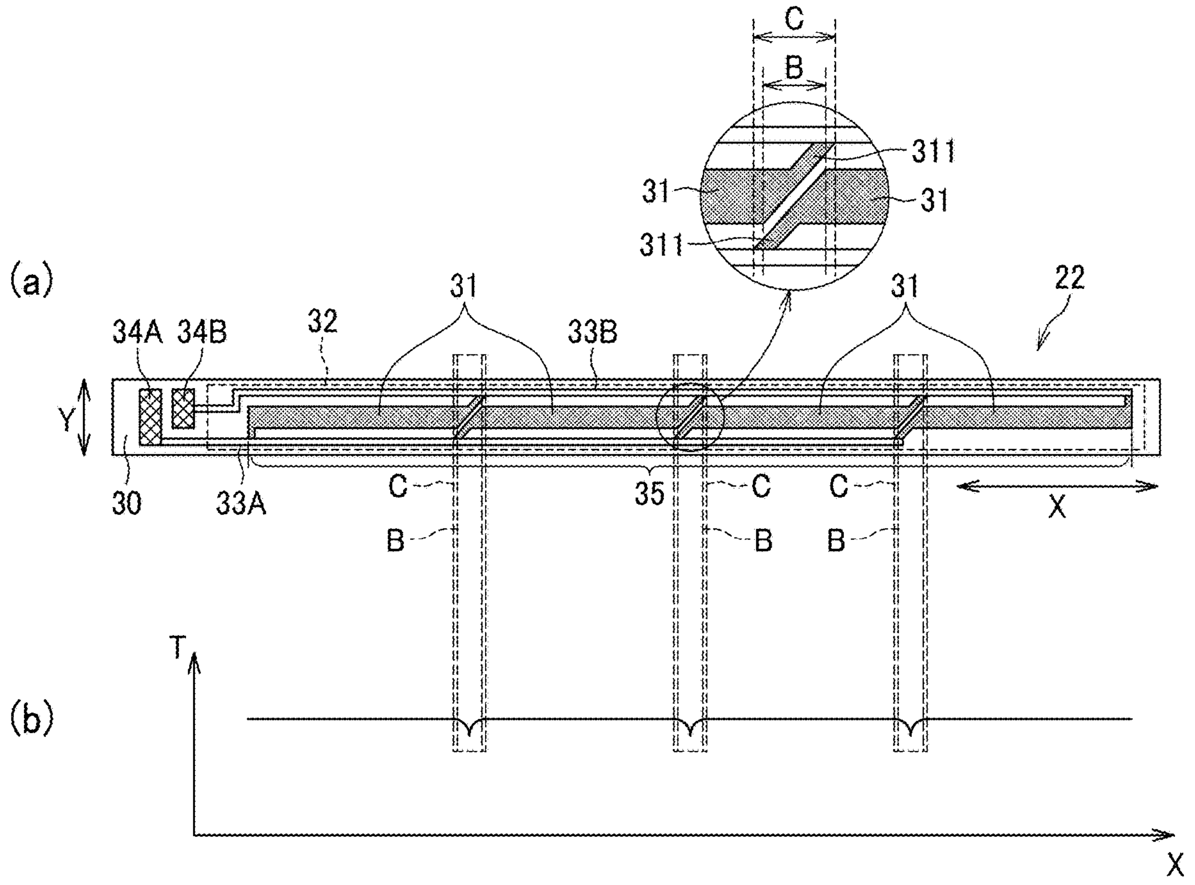
FIG. 17 is a plan view of the heater depicted in FIG. 13, illustrating a temperature profile of the fixing belt in a longitudinal direction thereof.

FIG. 17 is a diagram illustrating a temperature profile of the fixing belt 20 in the longitudinal direction X thereof. FIG. 17 illustrates, in a section (a), an arrangement of the resistive heat generators 31 of the heater 22. FIG. 17 illustrates, in a section (b), a vertical axis that represents a temperature T of the fixing belt 20 and a horizontal axis that represents the longitudinal direction X of the fixing belt 20.

As illustrated in the sections (a) and (b) in FIG. 17, the heater 22 includes the plurality of resistive heat generators 31 separated and arranged in the longitudinal direction X of the heater 22 to produce a gap B (e.g., a dividing region) between the adjacent resistive heat generators 31 in the longitudinal direction X of the heater 22. In other words, the plurality of resistive heat generators 31 of the heater 22 is arranged with the gap B between the adjacent resistive heat generators 31. The gap B defines a dividing region or a dividing span. An opposed portion of the resistive heat generators 31, that is disposed opposite the gap B, occupies an area smaller than an area of other portion of each of the resistive heat generators 31, thus generating a decreased amount of heat. Accordingly, an opposed portion of the fixing belt 20, that is disposed opposite the gap B, has a lower temperature compared to other portion of the fixing belt 20, causing uneven temperature of the fixing belt 20 in the longitudinal direction X thereof. The adjacent resistive heat generators 31 define an enlarged gap region C (e.g., an enlarged dividing region) encompassing the gap B, serving as the dividing region, and a peripheral region thereof. The heater 22 and the fixing belt 20 suffer from temperature decrease also in opposed portions thereof, that are disposed opposite the enlarged gap region C, respectively. Similarly, the heater 22 suffers from temperature decrease also in an opposed portion thereof, that is disposed opposite the gap B. As illustrated in an enlarged view in the section (a) in FIG. 17, the gap B indicates a region encompassing an entirety of the dividing region between the adjacent resistive heat generators 31 serving as a main heat generation portion of the heater 22 in the longitudinal direction X thereof. The resistive heat generator 31 includes a joint 311 that is coupled with the feeder 33A or 33B. The enlarged gap region C encompasses the joints 311 in addition to the gap B. The joint 311 defines a part of the resistive heat generator 31, that extends substantially in the orthogonal direction Y of the heater 22 and is coupled with the feeder 33A or 33B.

Figure 18:
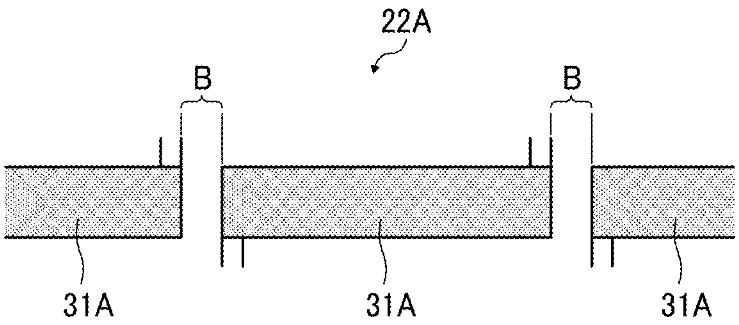
FIG. 18 is a diagram of the heater depicted in FIG. 15, illustrating a dividing region between the resistive heat generators.
Figure 19:
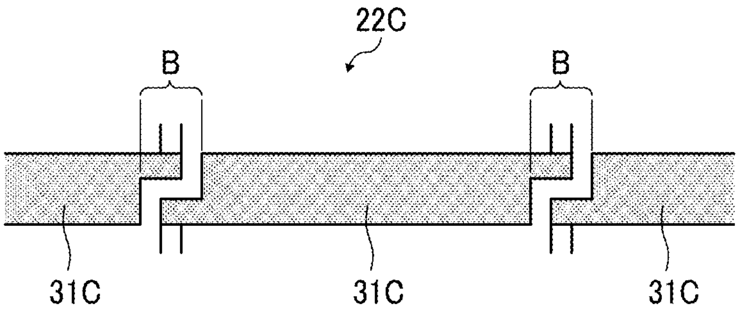
FIG. 19 is a diagram of a heater incorporating resistive heat generators that define a dividing region different from the dividing region depicted in FIG. 18.
Figure 20:
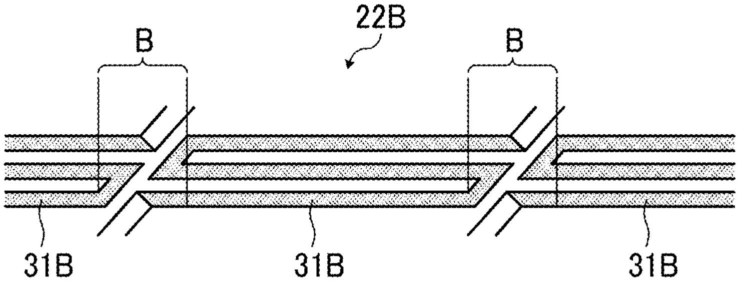
FIG. 20 is a diagram of the heater depicted in FIG. 16, illustrating a dividing region between the resistive heat generators.

FIG. 18 illustrates the heater 22A depicted in FIG. 15 that includes the resistive heat generators 31A that are rectangular. In the heater 22A also, a temperature of an opposed portion of the heater 22A, that is disposed opposite the gap B, is lower than a temperature of other portion of the heater 22A. FIG. 19 illustrates a heater 22C that includes a plurality of resistive heat generators 31C that is zigzag. In the heater 22C also, a temperature of an opposed portion of the heater 22C, that is disposed opposite the gap B, is lower than a temperature of other portion of the heater 22C. FIG. 20 illustrates the heater 22B depicted in FIG. 16 that includes the resistive heat generators 31B including the linear portion that defines the parallelogram. In the heater 22B also, a temperature of an opposed portion of the heater 22B, that is disposed opposite the gap B, is lower than a temperature of other portion of the heater 22B. As illustrated in FIGS. 17, 19, and 20, the adjacent resistive heat generators 31, 31C, and 31B overlap each other in the longitudinal direction X of the heaters 22, 22C, and 22B, suppressing temperature decrease of the opposed portion of each of the heaters 22, 22C, and 22B, that is disposed opposite the gap B, compared to other portion of each of the heaters 22, 22C, and 22B.

The fixing device 9 according to the embodiment incorporates the first thermal conductor 28 that suppresses temperature decrease at the gap B and thereby suppresses uneven temperature of the fixing belt 20 in the longitudinal direction X thereof.

A description is provided of a configuration of the first thermal conductor 28 in detail.

As illustrated in FIG. 2, the first thermal conductor 28 is interposed between the heater 22 and the stay 24 in the horizontal direction in FIG. 2. Specifically, the first thermal conductor 28 is sandwiched between the heater 22 and the heater holder 23. For example, the first thermal conductor 28 has one face that contacts a back face of the base 30 of the heater 22 and another face that contacts the heater holder 23.

The stay 24 includes the two arms 24*a* (e.g., perpendicular portions) that extend in a thickness direction of the heater 22 and the like. Each of the arms 24*a* has a contact face that contacts the heater holder 23 directly or is disposed opposite the heater holder 23 via the conductive member 40 indirectly, thus supporting the heater holder 23, the first thermal conductor 28, and the heater 22. The contact faces of the arms 24*a* are disposed outboard from the resistive heat generators 31 in the orthogonal direction Y (e.g., a vertical direction in FIG. 2) of the heater 22. Thus, the stay 24 suppresses conduction of heat thereto from the heater 22, causing the heater 22 to heat the fixing belt 20 efficiently.

As illustrated in FIG. 21, the first thermal conductor 28 is a plate having a thickness of 0.3 mm, a length of 222 mm in the longitudinal direction X of the first thermal conductor 28, and a width of 10 mm in the orthogonal direction Y According to the embodiment, the first thermal conductor 28 is constructed of a single plate. Alternatively, the first thermal conductor 28 may be constructed of a plurality of members. FIG. 21 omits illustration of the guide 26 and the guide rib 260 depicted in FIG. 2.

The first thermal conductor 28 is fitted to the recess 23*e* of the heater holder 23. The heater 22 is attached to the heater holder 23 from above the first thermal conductor 28. Thus, the heater holder 23 and the heater 22 sandwich and hold the first thermal conductor 28. According to the embodiment, the first thermal conductor 28 has a length in the longitudinal direction X thereof, which is equivalent to a length of the heater 22 in the longitudinal direction X thereof. The heater holder 23 includes side walls 23*e*1, serving as longitudinal direction restrictors, that are disposed at both lateral ends of the heater holder 23 in the longitudinal direction X thereof, respectively, and define the recess 23*e*. The side walls 23*e*1 restrict motion of the first thermal conductor 28 and the heater 22 in the longitudinal direction X thereof. Thus, the side walls 23*e*1 restrict shifting of the first thermal conductor 28 in the longitudinal direction X thereof inside the fixing device 9, improving efficiency in thermal conduction in a target span in the longitudinal direction X of the first thermal conductor 28. The heater holder 23 further includes side walls 23*e*2, serving as orthogonal direction restrictors, that are disposed at both ends of the heater holder 23 in the orthogonal direction Y thereof, respectively, and define the recess 23*e*. The side walls 23*e*2 restrict motion of the first thermal conductor 28 and the heater 22 in the orthogonal direction Y thereof.

Figure 22:
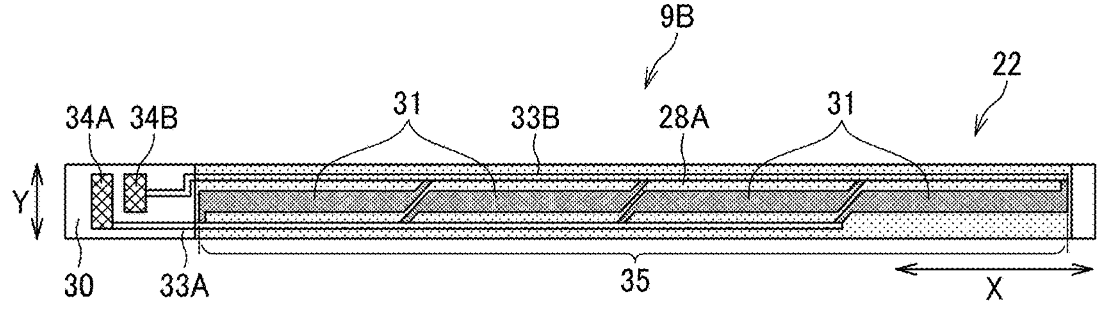
FIG. 22 is a plan view of the heater depicted in FIG. 13, illustrating an arrangement of a first thermal conductor as a variation of the first thermal conductor depicted in FIG. 21.
Figure 23:
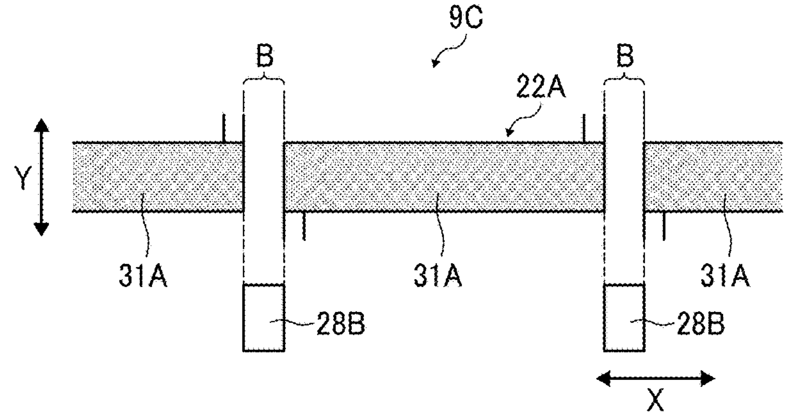
FIG. 23 is a plan view of the heater depicted in FIG. 18, illustrating a first thermal conductor as another variation of the first thermal conductor depicted in FIG. 21.
Figure 24:
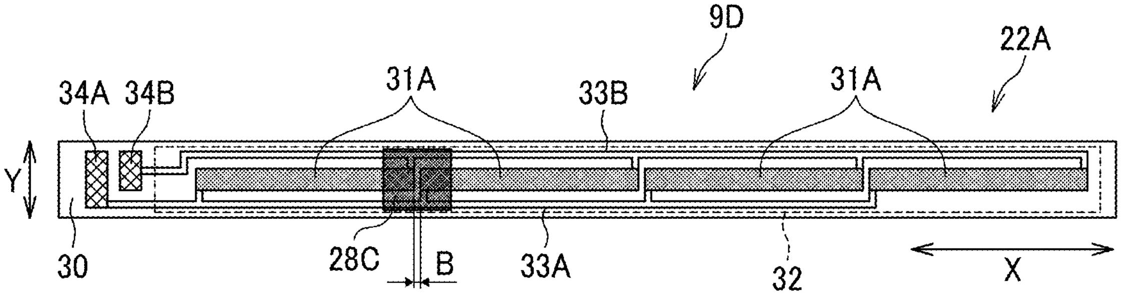
FIG. 24 is a plan view of the heater depicted in FIG. 15, illustrating a first thermal conductor as yet another variation of the first thermal conductor depicted in FIG. 21.

The first thermal conductor 28 may extend in a span other than a span in which the first thermal conductor 28 extends in the longitudinal direction X thereof as illustrated in FIG. 21. For example, FIG. 22 illustrates a fixing device 9B incorporating a first thermal conductor 28A that extends in a span that is hatched in FIG. 22 and is defined by the heat generation portion 35 in the longitudinal direction X of the heater 22. FIG. 23 illustrates a fixing device 9C incorporating first thermal conductors 28B. Each of the first thermal conductors 28B is disposed opposite and spans an entire span of the gap B in the longitudinal direction X of the heater 22A in which the resistive heat generators 31A are arranged. FIG. 23 illustrates the resistive heat generators 31A shifted from the first thermal conductors 28B vertically in FIG. 23 for convenience. Practically, the resistive heat generators 31A are substantially leveled with the first thermal conductors 28B in the orthogonal direction Y of the heater 22A. Alternatively, the first thermal conductors 28B may be disposed with respect to the resistive heat generators 31A with other arrangement. For example, the first thermal conductor 28B may span or cover a part of the resistive heat generator 31A in the orthogonal direction Y of the heater 22A. FIG. 24 illustrates a fixing device 9D incorporating a first thermal conductor 28C that spans or covers an entirety of the resistive heat generator 31A in the orthogonal direction Y of the heater 22A.

As illustrated in FIG. 24, the first thermal conductor 28C is disposed opposite and spans the gap B in the longitudinal direction X of the heater 22A. Additionally, the first thermal conductor 28C bridges the adjacent resistive heat generators 31A that sandwich the gap B. A state in which the first thermal conductor 28C bridges the adjacent resistive heat generators 31A denotes a state in which the first thermal conductor 28C overlaps the adjacent resistive heat generators 31A at least partially in the longitudinal direction X of the heater 22A. Alternatively, the first thermal conductors 28C may be disposed opposite the gaps B of the heater 22A, respectively. Yet alternatively, for example, as illustrated in FIG. 24, the first thermal conductor 28C may be disposed opposite a part of the gaps B, for example, one of the gaps B. A state in which the first thermal conductor 28C spans the gap B in the longitudinal direction X of the heater 22A denotes that at least a part of the first thermal conductor 28C overlaps the gap B in the longitudinal direction X of the heater 22A.

As illustrated in FIG. 2, as the pressure roller 21 applies pressure to a heater (e.g., the heaters 22, 22A, 22B, and 22C), the heater and the heater holder 23 sandwich a first thermal conductor (e.g., the first thermal conductors 28, 28A, 28B, and 28C) such that the first thermal conductor contacts the heater and the heater holder 23. As the first thermal conductor contacts the heater, the first thermal conductor conducts heat generated by the heater in the longitudinal direction X thereof with improved efficiency. The first thermal conductor is disposed opposite at least one gap B between adjacent resistive heat generators (e.g., the resistive heat generators 31, 31A, 31B, and 31C) arranged in the longitudinal direction X of the heater. Thus, the first thermal conductor improves efficiency in conduction of heat at the gaps B, increases an amount of heat conducted to the gaps B, and increases the temperature of the heater at the gaps B arranged in the longitudinal direction X of the heater, thus suppressing uneven temperature of the heater in the longitudinal direction X thereof. Accordingly, the first thermal conductor suppresses uneven temperature of the fixing belt 20 in the longitudinal direction X thereof. Consequently, the fixing belt 20 suppresses uneven fixing and uneven gloss of a toner image fixed on a sheet P. The heater does not heat the fixing belt 20 redundantly to attain sufficient fixing performance at the gaps B, causing a fixing device (e.g., the fixing devices 9, 9B, 9C, and 9D) to save energy. The first thermal conductor extends throughout an entire span of the heat generation portion 35 in the longitudinal direction X of the heater. Accordingly, the first thermal conductor improves efficiency in conduction of heat of the heater in an entirety of a main heating span of the heater disposed opposite an imaging span of a toner image formed on a sheet P conveyed through the fixing nip N. Consequently, the first thermal conductor suppresses uneven temperature of the heater and the fixing belt 20 in the longitudinal direction X thereof.

According to the embodiment, the first thermal conductor is coupled with the resistive heat generators having the PTC property described above, suppressing overheating of the fixing belt 20 in the non-conveyance span where a sheet P having a decreased size is not conveyed effectively. For example, the PTC property suppresses an amount of heat generated by the resistive heat generators in the non-conveyance span. Additionally, the first thermal conductor efficiently conducts heat from the non-conveyance span on the fixing belt 20 that suffers from temperature increase to a sheet conveyance span on the fixing belt 20, where the sheet P is conveyed, thus suppressing overheating of the fixing belt 20 in the non-conveyance span effectively.

Since the heater generates heat in a decreased amount at the gap B between the adjacent resistive heat generators, the heater has a decreased temperature also in a periphery of the gap B. To address the circumstance, the first thermal conductor is preferably disposed also in the periphery of the gap B. For example, according to the embodiment illustrated in the section (a) of FIG. 17, the first thermal conductor 28 is disposed opposite the enlarged gap region C. Hence, the first thermal conductor 28 improves efficiency in conduction of heat at the gap B and the periphery thereof in the longitudinal direction X of the heater 22, suppressing uneven temperature of the heater 22 in the longitudinal direction X thereof. According to the embodiment, the first thermal conductor 28 extends throughout the entire span of the heat generation portion 35 in the longitudinal direction X of the heater 22. Accordingly, the first thermal conductor 28 suppresses uneven temperature of the heater 22 and the fixing belt 20 in the longitudinal direction X thereof more effectively.

A description is provided of a construction of a fixing device 9E according to an embodiment of the present disclosure.

Figure 25:
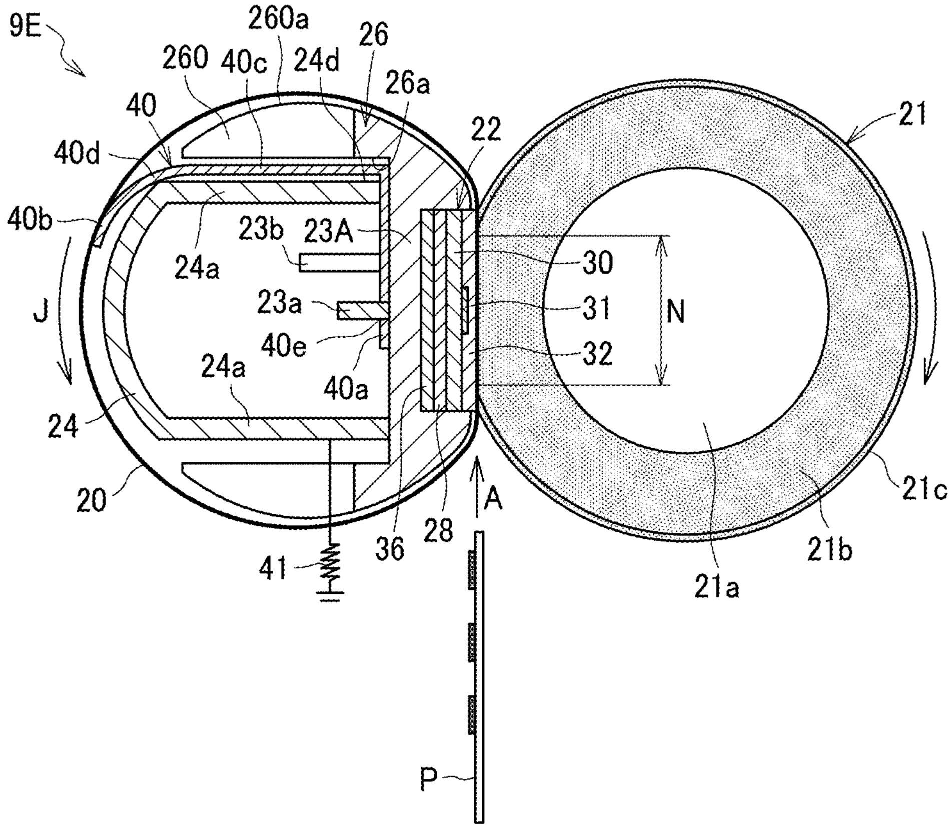
FIG. 25 is a schematic side cross-sectional view of a fixing device according to another embodiment of the present disclosure, that is different from the fixing device depicted in FIG. 2 and is installable in the image forming apparatus depicted in FIG. 1.

As illustrated in FIG. 25, the fixing device 9E according to the embodiment includes the second thermal conductors 36 and a heater holder 23A. The second thermal conductors 36 are sandwiched between the heater holder 23A and the first thermal conductor 28. Each of the second thermal conductors 36 is disposed at a position different from a position of the first thermal conductor 28 in a laminating direction (e.g., a horizontal direction in FIG. 25) in which the stay 24, the heater holder 23A, the second thermal conductor 36, the first thermal conductor 28, and the heater 22 are arranged. Specifically, the second thermal conductors 36 are superimposed on the first thermal conductor 28. Unlike FIG. 2 illustrating the fixing device 9, FIG. 25 illustrates a cross section that crosses a longitudinal direction of the fixing device 9E in which the second thermal conductors 36 are arranged. For example, FIG. 25 illustrates the cross section where the second thermal conductor 36 is disposed and the thermistor 25 is not disposed.

The second thermal conductor 36 is made of a material having a thermal conductivity greater than a thermal conductivity of the base 30. For example, the second thermal conductor 36 is made of graphene or graphite. According to the embodiment, the second thermal conductor 36 is a graphite sheet having a thickness of 1 mm. Alternatively, the second thermal conductor 36 may be a plate made of aluminum, copper, silver, or the like.

Figure 26:
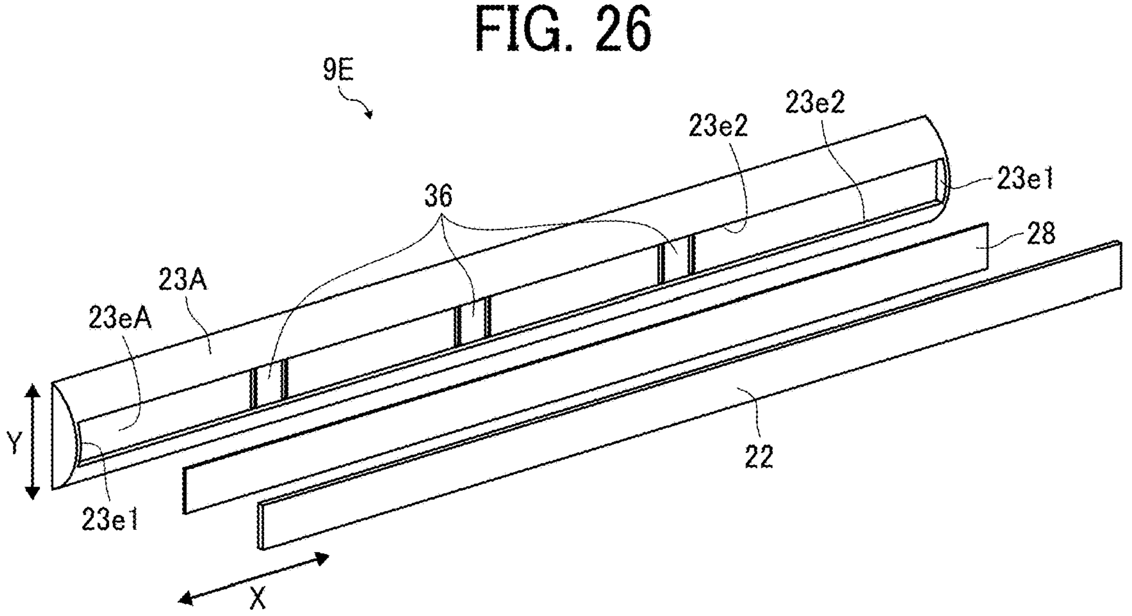
FIG. 26 is a perspective view of the heater, the first thermal conductor, second thermal conductors, and a heater holder incorporated in the fixing device depicted in FIG. 25.

As illustrated in FIG. 26, the plurality of second thermal conductors 36 is arranged on a plurality of parts on the heater holder 23A in the longitudinal direction X thereof, respectively. The heater holder 23A includes a recess 23*e*A that includes cavities placed with the second thermal conductors 36, respectively. The cavities are stepped down by one step from other portion of the recess 23*e*A. The second thermal conductor 36 and the heater holder 23A define a gap therebetween at both lateral ends of the second thermal conductor 36 in the longitudinal direction X of the heater holder 23A. Thus, the second thermal conductor 36 suppresses conduction of heat to the heater holder 23A from both lateral ends of the second thermal conductor 36 in the longitudinal direction X of the heater holder 23A, causing the heater 22 to heat the fixing belt 20 efficiently. FIG. 26 omits illustration of the guide 26 depicted in FIG. 2.

Figure 27:
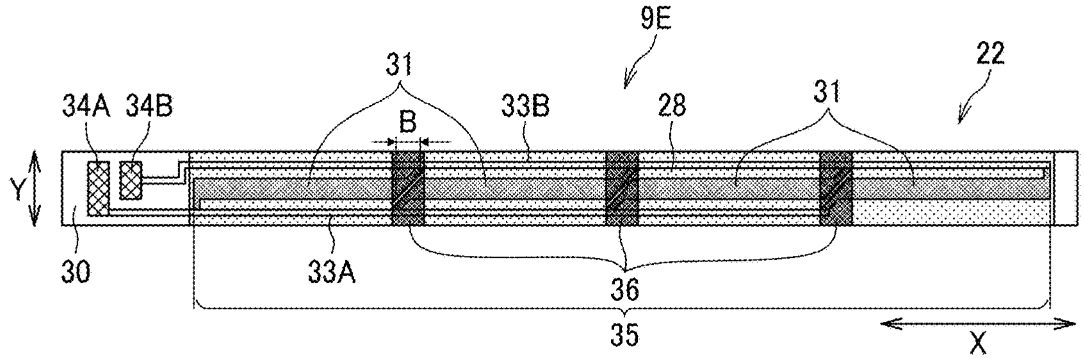
FIG. 27 is a plan view of the heater depicted in FIG. 26, illustrating an arrangement of the first thermal conductor and the second thermal conductors.
Figure 31:
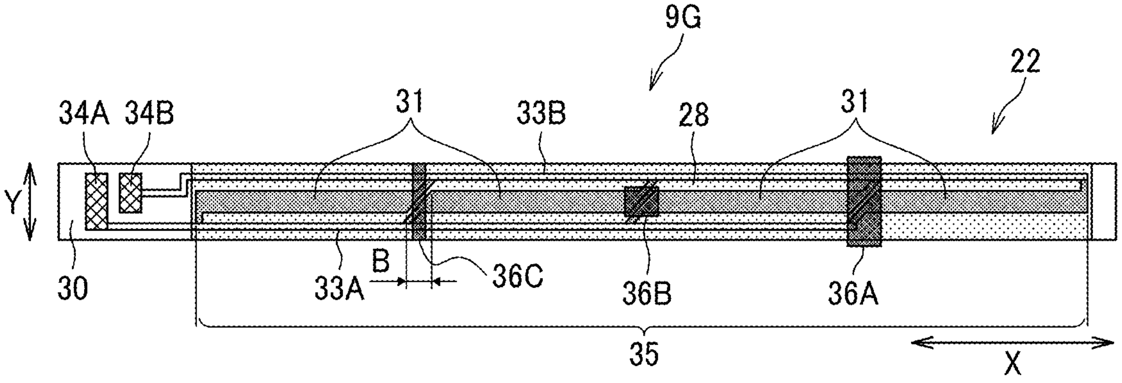
FIG. 31 is a plan view of the heater depicted in FIG. 27, illustrating an arrangement of second thermal conductors as a variation of the second thermal conductors depicted in FIG. 27.

As illustrated in FIG. 27, the second thermal conductor 36 that is hatched is disposed opposite the gap B between the adjacent resistive heat generators 31 and overlaps at least a part of the adjacent resistive heat generators 31 in the longitudinal direction X of the heater 22. According to the embodiment, the second thermal conductor 36 extends throughout the entire span of the gap B. FIG. 27 and FIG. 31 referred to in a description below illustrate the first thermal conductor 28 that is disposed opposite and spans the heat generation portion 35 in the longitudinal direction X of the heater 22. Alternatively, the first thermal conductor 28 may span differently as described above.

The fixing device 9E according to the embodiment includes, in addition to the first thermal conductor 28, the second thermal conductors 36 each of which is disposed opposite the gap B and overlaps at least a part of the adjacent resistive heat generators 31 in the longitudinal direction X of the heater 22. The second thermal conductors 36 improve efficiency in conduction of heat at the gaps B in the longitudinal direction X of the heater 22, suppressing uneven temperature of the heater 22 in the longitudinal direction X thereof more effectively.

Figure 28:
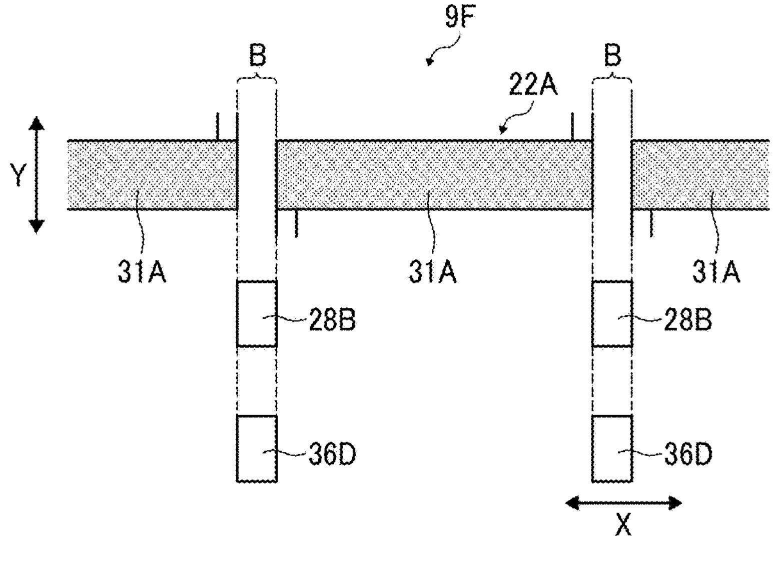
FIG. 28 is a plan view of the heater depicted in FIG. 23, illustrating the first thermal conductor depicted in FIG. 23 and a second thermal conductor that are arranged with an arrangement different from the arrangement depicted in FIG. 27.

FIG. 28 illustrates a fixing device 9F including the first thermal conductors 28B, second thermal conductors 36D, and the heater 22A including the resistive heat generators 31A. The first thermal conductor 28B and the second thermal conductor 36D are preferably disposed opposite the entire span of the gap B in the longitudinal direction X of the heater 22A. Accordingly, the first thermal conductor 28B and the second thermal conductor 36D improve efficiency in conduction of heat at the gap B compared to an outboard region of the heater 22A, which is other than the gap B. FIG. 28 illustrates the resistive heat generators 31A shifted from the first thermal conductors 28B and the second thermal conductors 36D vertically in FIG. 28 for convenience. Practically, the resistive heat generators 31A are substantially leveled with the first thermal conductors 28B and the second thermal conductors 36D in the orthogonal direction Y of the heater 22A. Alternatively, the first thermal conductors 28B and the second thermal conductors 36D may be disposed with respect to the resistive heat generators 31A with other arrangement. For example, the first thermal conductor 28B and the second thermal conductor 36D may span a part of the resistive heat generator 31A in the orthogonal direction Y of the heater 22A.

Unlike the embodiment described above, according to an embodiment of the present disclosure, each of a first thermal conductor (e.g., the first thermal conductors 28, 28A, 28B, and 28C) and a second thermal conductor (e.g., the second thermal conductors 36 and 36D) is made of a graphene sheet. Hence, each of the first thermal conductor and the second thermal conductor has an enhanced thermal conductivity in a predetermined direction along a surface of the graphene sheet, that is, a longitudinal direction of a heater (e.g., the heaters 22, 22A, 22B, and 22C), not a thickness direction of the first thermal conductor and the second thermal conductor. Accordingly, the first thermal conductor and the second thermal conductor suppress uneven temperature of the heater and the fixing belt 20 in the longitudinal direction X thereof effectively.

Figure 29:
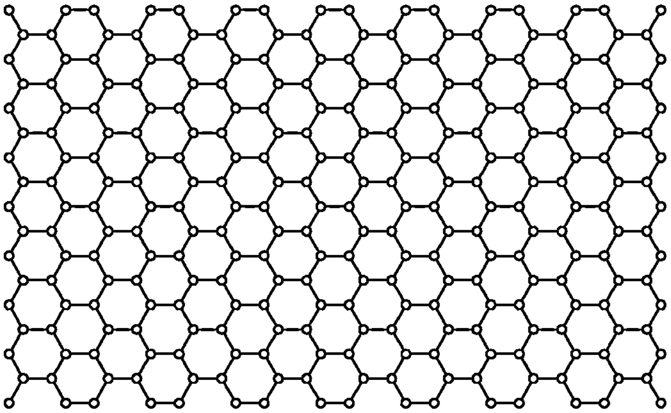
FIG. 29 is a diagram of a crystalline structure of atoms of graphene.

Graphene is thin powder. As illustrated in FIG. 29, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms. The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene $C_{60}$, $C_{70}$, and $C_{80}$, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Figure 30:
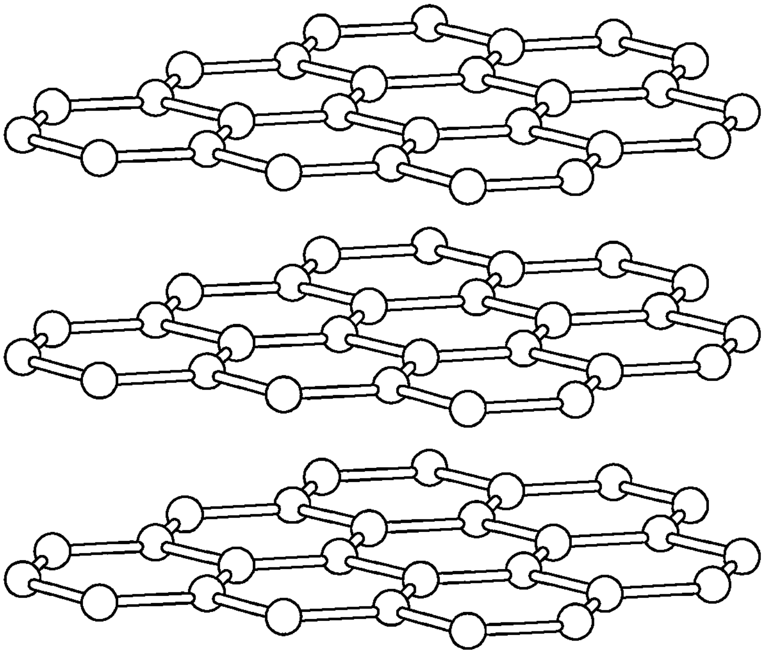
FIG. 30 is a diagram of a crystalline structure of atoms of graphite.

Graphite is constructed of stacked layers of graphene and is highly anisotropic in thermal conduction. As illustrated in FIG. 30, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 28, 28A, 28B, and 28C) or a second thermal conductor (e.g., the second thermal conductors 36 and 36D) is made of graphite. Accordingly, the first thermal conductor or the second thermal conductor attains an efficiency in conduction of heat in the longitudinal direction X of a heater (e.g., the heaters 22, 22A, 22B, and 22C), which is greater than an efficiency in conduction of heat in a thickness direction, that is, the laminating direction (e.g., the horizontal direction in FIG. 25) in which the stay 24, the heater holder 23A, the second thermal conductor 36, the first thermal conductor 28, and the heater 22 are arranged, thus suppressing conduction of heat to the heater holder 23A. Consequently, the first thermal conductor or the second thermal conductor suppresses uneven temperature of the heater in the longitudinal direction X thereof efficiently. Additionally, the first thermal conductor or the second thermal conductor minimizes heat conducted to the heater holder 23A. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, a fixing device (e.g., the fixing devices 9E and 9F) employs the graphite sheet having a decreased thickness to decrease thermal capacity of the fixing device. If the fixing nip N and the heater have an increased length in the longitudinal direction X thereof, the first thermal conductor or the second thermal conductor also has an increased length in the longitudinal direction X of the heater.

In view of increasing mechanical strength, the graphite sheet preferably has a number of layers that is not smaller than 11 layers. The graphite sheet may include a part constructed of a single layer and another part constructed of a plurality of layers.

The second thermal conductor 36 is disposed opposite the gap B between the adjacent resistive heat generators 31 and the enlarged gap region C depicted in FIG. 17 and overlaps at least a part of the adjacent resistive heat generators 31 in the longitudinal direction X of the heater 22. Hence, the second thermal conductor 36 may be positioned with respect to the resistive heat generators 31 differently from the second thermal conductor 36 depicted in FIG. 27. For example, FIG. 31 illustrates a fixing device 9G including a second thermal conductor 36A that protrudes beyond the base 30 bidirectionally in the orthogonal direction Y of the heater 22. The fixing device 9G further includes a second thermal conductor 36B that is disposed in a span of the resistive heat generator 31 in the orthogonal direction Y of the heater 22. The fixing device 9G further includes a second thermal conductor 36C that spans a part of the gap B.

Figure 32:
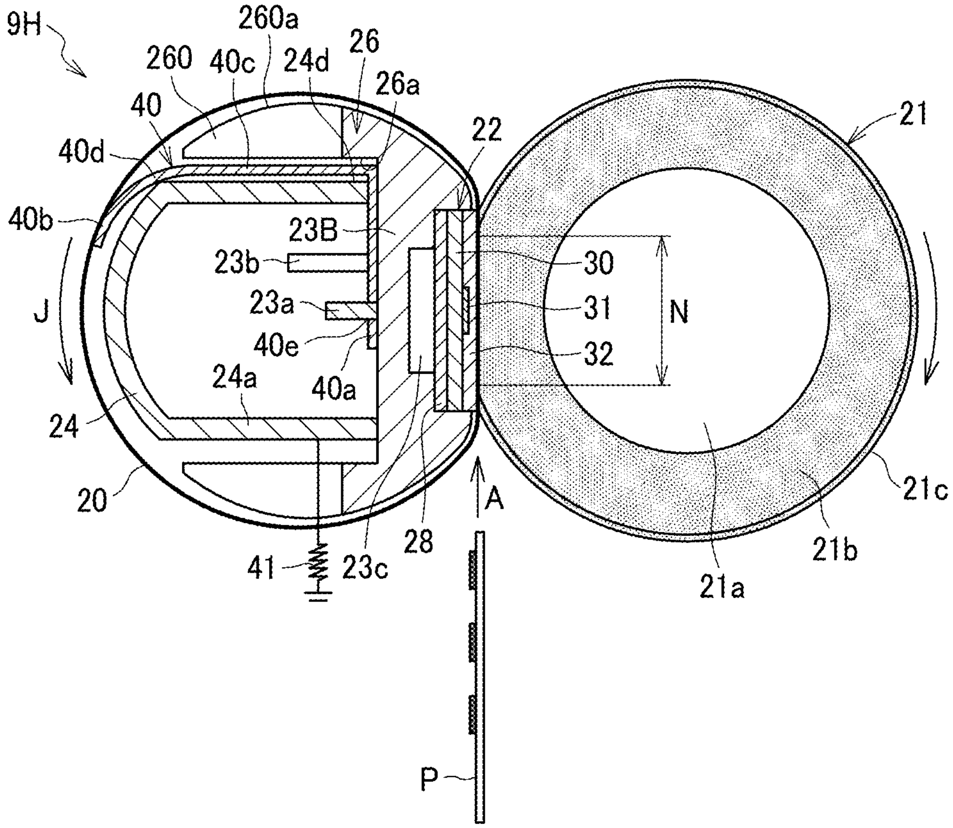
FIG. 32 is a schematic side cross-sectional view of a fixing device according to yet another embodiment of the present disclosure, that is different from the fixing devices depicted in FIGS. 2 and 25, respectively, and is installable in the image forming apparatus depicted in FIG. 1.

FIG. 32 illustrates a fixing device 9H according to an embodiment of the present disclosure that includes a heater holder 23B including a retracted portion 23*c* (e.g., a clearance) that is interposed between the first thermal conductor 28 and a body of the heater holder 23B in a thickness direction of the heater holder 23B (e.g., a horizontal direction in FIG. 32). For example, the retracted portion 23*c* is disposed in a part of the recess 23*e*A depicted in FIG. 26, which accommodates the heater 22, the first thermal conductor 28, and the second thermal conductors 36. Apart of the recess 23*e*A is stepped down from other part of the recess 23*e*A, that accommodates the first thermal conductor 28, to produce the retracted portion 23*c* serving as a thermal insulation layer. The part of the recess 23*e*A spans a part or an entirety of the heater holder 23B, that is disposed outboard from the second thermal conductor 36 in the longitudinal direction X of the heater 22, and spans a part of the heater holder 23B in the orthogonal direction Y of the heater 22. Accordingly, the heater holder 23B contacts the first thermal conductor 28 with a decreased contact area, thus suppressing conduction of heat from the first thermal conductor 28 to the heater holder 23B and causing the heater 22 to heat the fixing belt 20 efficiently. On a cross section that intersects a longitudinal direction of the fixing device 9H and is provided with the second thermal conductor 36, the second thermal conductor 36 contacts the heater holder 23B like the second thermal conductor 36 of the fixing device 9E according to the embodiment described above with reference to FIG. 25.

According to the embodiment, the retracted portion 23*c* spans an entirety of the resistive heat generator 31 in the orthogonal direction Y (e.g., a vertical direction in FIG. 32) of the heater 22. Thus, the retracted portion 23*c* suppresses conduction of heat from the first thermal conductor 28 to the heater holder 23B, causing the heater 22 to heat the fixing belt 20 efficiently. Alternatively, instead of the retracted portion 23*c* that defines the clearance, the fixing device 9H may incorporate a thermal insulator that has a thermal conductivity smaller than a thermal conductivity of the heater holder 23B, as the thermal insulation layer.

According to the embodiments described above, the second thermal conductor 36 is provided separately from the first thermal conductor 28. Alternatively, the fixing device 9H may have other configuration. For example, the first thermal conductor 28 may include an opposed portion that is disposed opposite the gap B and has a thickness greater than a thickness of an outboard portion of the first thermal conductor 28, which is other than the opposed portion. Thus, the opposed portion of the first thermal conductor 28 is equivalent to the second thermal conductor 36.

The fixing devices 9E and 9H depicted in FIGS. 25 and 32, respectively, also incorporate the pivot restrictor such as the pivot restricting rib 23*b* that suppresses pivoting and resultant shifting of the conductive member 40.

The above describes the embodiments of the present disclosure. However, the technology of the present disclosure is not limited to the embodiments described above. For example, the embodiments may be modified within the scope of the technology of the present disclosure.

Figure 33:
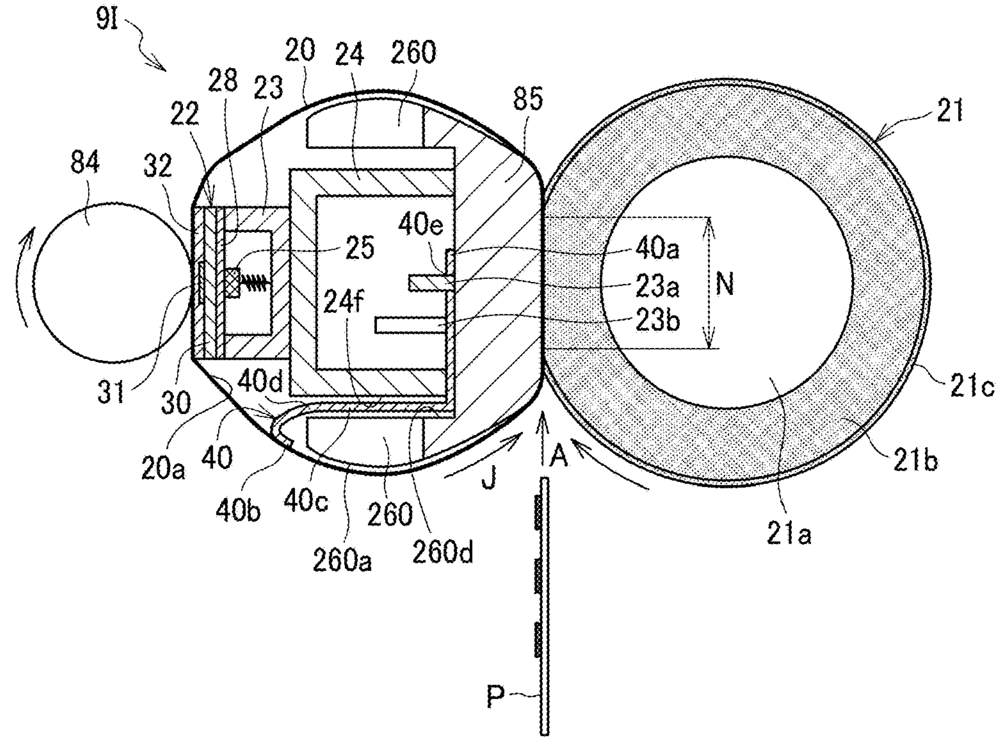
FIG. 33 is a schematic side cross-sectional view of a fixing device according to yet another embodiment of the present disclosure, that is installable in the image forming apparatus depicted in FIG. 1.
Figure 34:
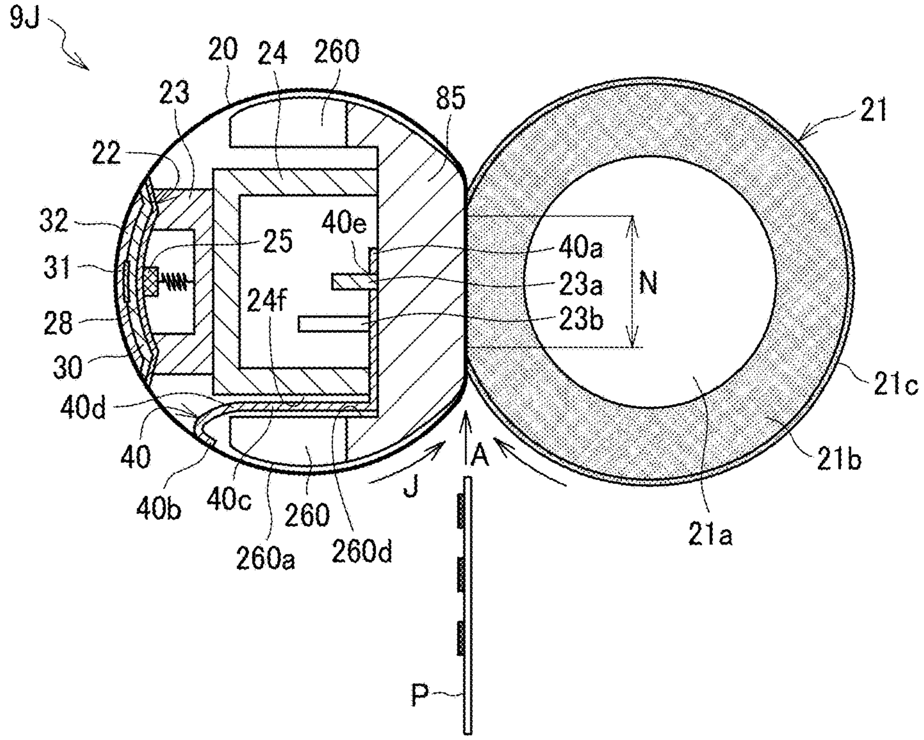
FIG. 34 is a schematic side cross-sectional view of a fixing device according to yet another embodiment of the present disclosure, that is installable in the image forming apparatus depicted in FIG. 1.
Figure 35:
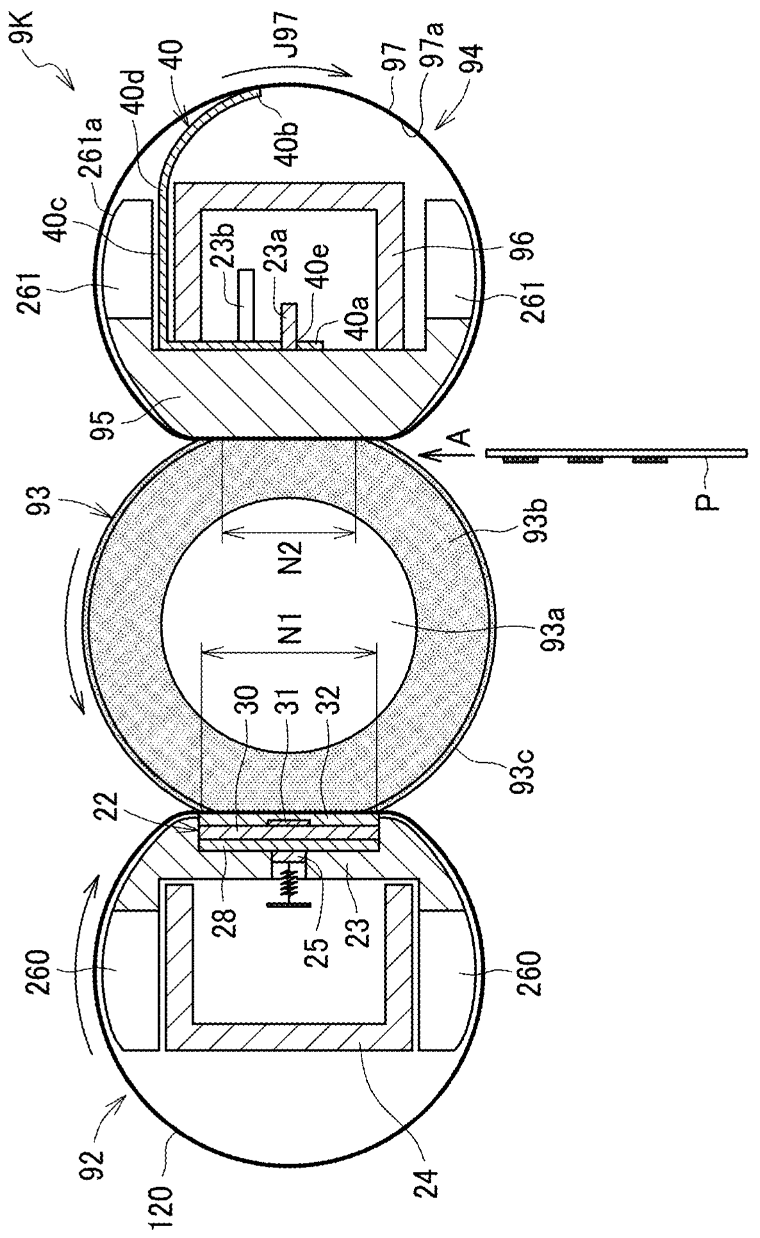
FIG. 35 is a schematic side cross-sectional view of a fixing device according to yet another embodiment of the present disclosure, that is installable in the image forming apparatus depicted in FIG. 1.

The embodiments of the present disclosure are also applied to fixing devices 9I, 9J, and 9K illustrated in FIGS. 33, 34, and 35, respectively, other than the fixing devices 9, 9B, 9C, 9D, 9E, 9F, 9G, and 9H described above. Referring to FIGS. 33, 34, and 35, the following describes a construction of each of the fixing devices 9I, 9J, and 9K briefly.

A description is provided of the construction of the fixing device 9I.

As illustrated in FIG. 33, the fixing device 9I includes a pressing roller 84 that is disposed opposite the pressure roller 21 via the fixing belt 20. The pressing roller 84 serves as an opposed rotator that is disposed opposite the fixing belt 20 serving as a rotator and rotates. The pressing roller 84 and the heater 22 sandwich the fixing belt 20 such that the heater 22 heats the fixing belt 20. The fixing device 9I further includes a nip formation pad 85 that is disposed opposite the inner circumferential face 20*a* of the fixing belt 20 and is disposed opposite the pressure roller 21 via the fixing belt 20. The stay 24 supports the nip formation pad 85. The nip formation pad 85 and the pressure roller 21 sandwich the fixing belt 20 to form the fixing nip N between the fixing belt 20 and the pressure roller 21.

The guide ribs 260 are disposed at an upstream part and a downstream part of the nip formation pad 85, respectively, in the rotation direction J of the fixing belt 20. The conductive member 40 is interposed between the upstream, guide rib 260 and the stay 24. For example, the upstream, guide rib 260 includes a first opposed face 260*d* serving as a first opposed member. The stay 24 includes a second opposed face 24*f* serving as a second opposed member. The opposed portion 40*c* of the conductive member 40 is disposed opposite the first opposed face 260*d* and the second opposed face 24*f*. The opposed portion 40*c* extends along the first opposed face 260*d* and the second opposed face 24*f*. The free end 40*b* of the conductive member 40 contacts the inner circumferential face 20*a* of the fixing belt 20 serving as the rotator.

A description is provided of the construction of the fixing device 9J.

The fixing device 9J illustrated in FIG. 34 omits the pressing roller 84 depicted in FIG. 33. In order to attain a contact length with which the heater 22 contacts the fixing belt 20 in the circumferential direction thereof, the heater 22 is an arc having a curvature that is equivalent to a curvature of the fixing belt 20. Other construction of the fixing device 9J is equivalent to the construction of the fixing device 9I depicted in FIG. 33.

A description is provided of the construction of the fixing device 9K.

As illustrated in FIG. 35, the fixing device 9K includes a heating assembly 92, a fixing roller 93 serving as a fixing rotator, and a pressure assembly 94. The heating assembly 92 includes the heater 22, the first thermal conductor 28, the heater holder 23, and the stay 24 that are described in the embodiments above and a heating belt 120. The fixing roller 93 presses against the heating belt 120 to form a heating nip N1 therebetween. The fixing device 9K further includes a pressure belt 97 serving as a belt. The fixing roller 93 serves as an opposed rotator that is disposed opposite the pressure belt 97 and rotates. The fixing roller 93 includes a core metal 93*a*, an elastic layer 93*b*, and a release layer 93*c*. The core metal 93*a* is solid and is made of iron. The elastic layer 93*b* is disposed on a surface of the core metal 93*a*. The release layer 93*c* is disposed on an outer face of the elastic layer 93*b*. The pressure assembly 94 is disposed opposite the heating assembly 92 via the fixing roller 93. The pressure assembly 94 includes a nip formation pad 95, a stay 96, and the pressure belt 97. The stay 96 serves as a support that supports the nip formation pad 95. The pressure belt 97 rotates and is formed into a loop within which the nip formation pad 95 and the stay 96 are disposed. The pressure belt 97 and the fixing roller 93 define a fixing nip N2 therebetween. As a sheet P is conveyed through the fixing nip N2, the fixing roller 93 heated at the heating nip N1 and the pressure belt 97 fix a toner image formed on the sheet P thereon under heat and pressure. The pressure belt 97 rotates in a rotation direction J97.

The fixing device 9K further includes guide ribs 261 that are disposed at an upstream part and a downstream part of the nip formation pad 95, respectively, in the rotation direction J97 of the pressure belt 97. A plurality of guide ribs 261 is arranged in a longitudinal direction of the pressure belt 97. Each of the guide ribs 261 is substantially fan-shaped. The guide rib 261 includes a belt opposed face 261*a* that is disposed opposite an inner circumferential face 97*a* of the pressure belt 97. The belt opposed face 261*a* is an arc or a projecting curved face that projects toward the pressure belt 97 and extends in a circumferential direction of the pressure belt 97.

The conductive member 40 is interposed between the stay 96 and the downstream, guide rib 261. The positioning pin 23*a* holds the fixed end 40*a* of the conductive member 40. The free end 40*b* of the conductive member 40 contacts the inner circumferential face 97*a* of the pressure belt 97. If each of the release layer 93*c* serving as a surface layer of the fixing roller 93 and the heating belt 120 is made of a conductive material, the conductive member 40 may be interposed between the stay 24 and the guide rib 260 like the conductive member 40 of the fixing device 9 depicted in FIG. 2. In this case, the free end 40*b* of the conductive member 40 contacts an inner circumferential face of the heating belt 120 serving as a belt.

The fixing devices 9I, 9J, and 9K depicted in FIGS. 33, 34, and 35, respectively, also incorporate the pivot restrictor such as the pivot restricting rib 23*b* that suppresses pivoting and resultant shifting of the conductive member 40.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 36:
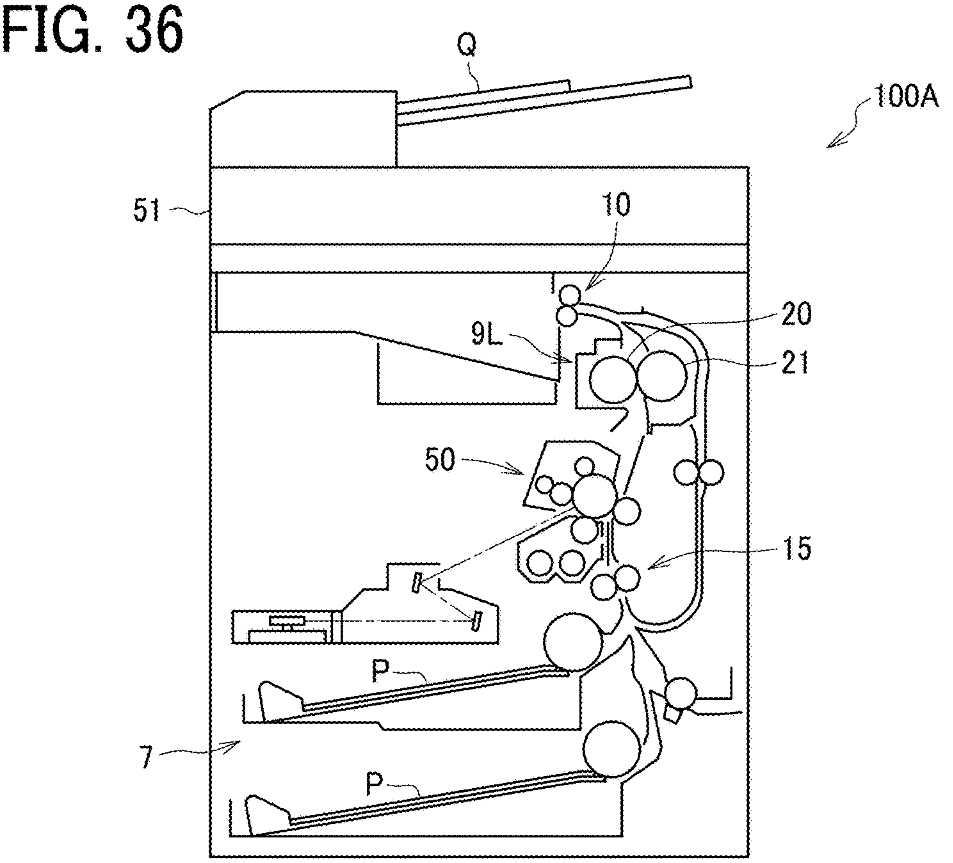
FIG. 36 is a schematic cross-sectional view of an image forming apparatus according to another embodiment of the present disclosure, that is different from the image forming apparatus depicted in FIG. 1.

For example, as illustrated in FIG. 36, an image forming apparatus 100A according to an embodiment of the present disclosure includes an image forming device 50 including a photoconductive drum, a sheet conveyance device including the timing roller pair 15, the sheet feeder 7, a fixing device 9L, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a sheet conveyance path one by one. The timing roller pair 15 conveys the sheet P conveyed through the sheet conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example. The fixing device 9L fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9L according to an embodiment of the present disclosure.

A description of elements of the fixing device 9L, which are common to the fixing device 9 depicted in FIG. 2, is omitted properly.

Figure 37:
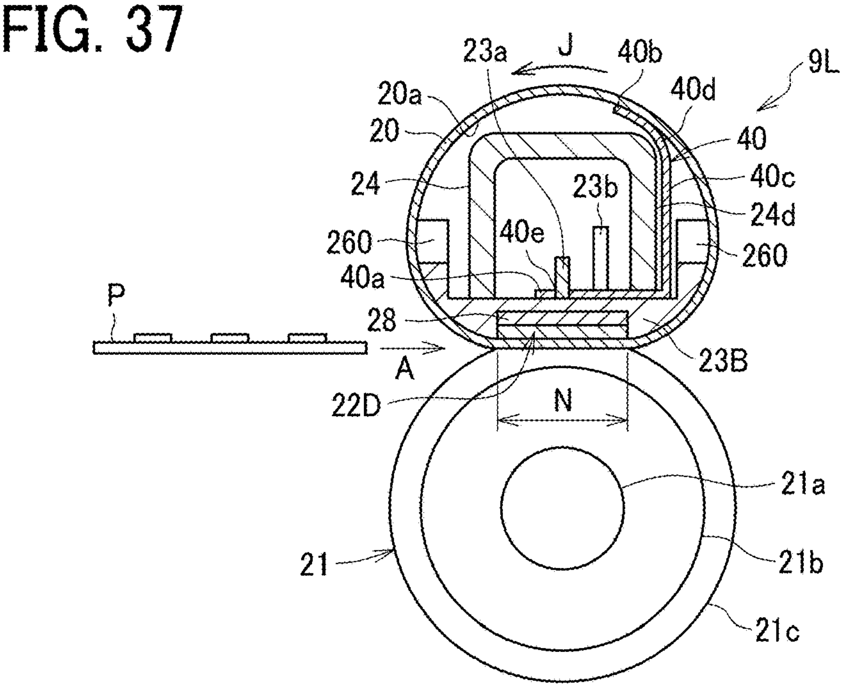
FIG. 37 is a schematic side cross-sectional view of a fixing device according to yet another embodiment of the present disclosure, that is incorporated in the image forming apparatus depicted in FIG. 36.
Figure 41:
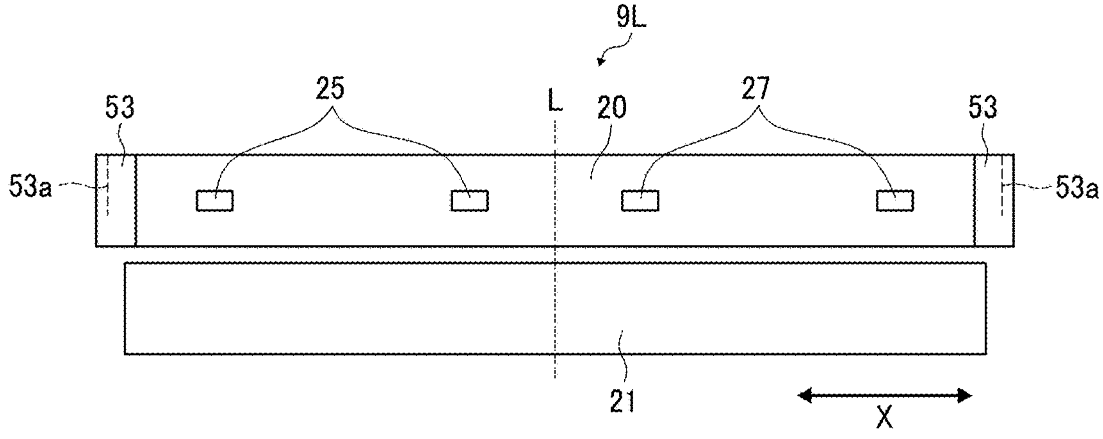
FIG. 41 is a diagram of thermistors, thermostats, and flanges incorporated in the fixing device depicted in FIG. 37, illustrating an arrangement of the thermistors and the thermostats.

As illustrated in FIG. 37, the fixing device 9L includes the fixing belt 20, the pressure roller 21, a heater 22D, a heater holder 23B, the stay 24, the thermistors 25 depicted in FIG. 41, the first thermal conductor 28, and the conductive member 40.

The fixing belt 20 and the pressure roller 21 define the fixing nip N therebetween. The fixing nip N has a nip width of 10 mm in the sheet conveyance direction A. The fixing belt 20 and the pressure roller 21 convey the sheet P at a linear velocity of 240 mm/s.

The fixing belt 20 includes the base layer made of polyimide and the release layer and does not include an elastic layer. The release layer is heat-resistant film made of fluororesin, for example. The fixing belt 20 has an outer diameter of approximately 24 mm.

The pressure roller 21 includes the core metal 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

Figure 38:
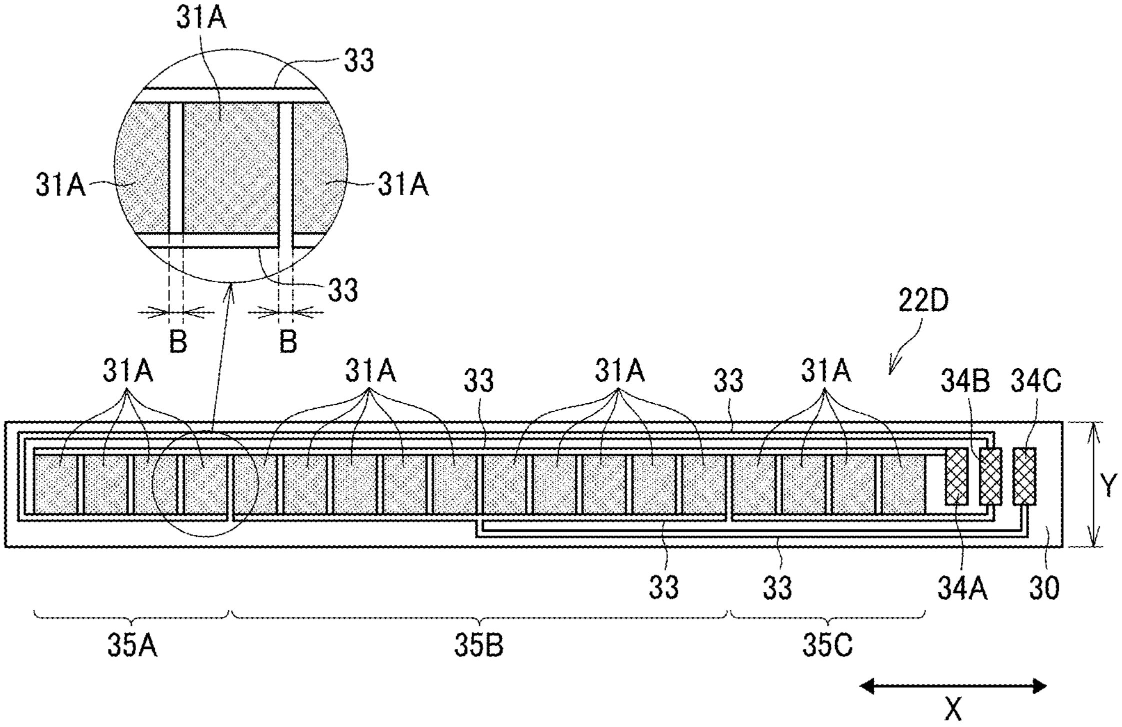
FIG. 38 is a plan view of a heater incorporated in the fixing device depicted in FIG. 37.

As illustrated in FIG. 38, the heater 22D includes the base 30, a thermal insulation layer, a conductor layer including the resistive heat generators 31A, and an insulating layer. The heater 22D has a total thickness of 1 mm. The heater 22D has a width of 13 mm in the orthogonal direction Y thereof.

As illustrated in FIG. 37, the conductive member 40 is interposed between the stay 24 and the downstream, guide rib 260. Like the conductive member 40 of the fixing device 9 depicted in FIG. 2, the fixed end 40*a* of the conductive member 40 is held by the positioning pin 23*a*. The free end 40*b* of the conductive member 40 contacts the inner circumferential face 20*a* of the fixing belt 20.

As illustrated in FIG. 38, the conductor layer of the heater 22D includes the plurality of resistive heat generators 31A, a plurality of feeders 33, the first electrode 34A, the second electrode 34B, and a third electrode 34C. According to the embodiment also, as illustrated in an enlarged view in FIG. 38, the gap B serving as the dividing region is interposed between the adjacent resistive heat generators 31A arranged in the longitudinal direction X of the heater 22D. FIG. 38 illustrates the two gaps B in the enlarged view. However, the gap B is disposed at each interval between the adjacent resistive heat generators 31A depicted in FIG. 38. The heater 22D further includes three heat generation portions 35A, 35B, and 35C each of which is constructed of the resistive heat generators 31A. As the first electrode 34A and the second electrode 34B are energized, the heat generation portions 35A and 35C generate heat. As the first electrode 34A and the third electrode 34C are energized, the heat generation portion 35B generates heat. Thus, the heat generation portion 35B disposed in a center span of the heater 22D in the longitudinal direction X thereof generates heat separately from the heat generation portions 35A and 35C disposed in both lateral end spans of the heater 22D, respectively, in the longitudinal direction X thereof. For example, in order to fix a toner image on a sheet P having a decreased size not greater than a predetermined size, the heat generation portion 35B generates heat. In order to fix a toner image on a sheet P having an increased size greater than the predetermined size, the heat generation portions 35A, 35B, and 35C generate heat.

Figure 39:
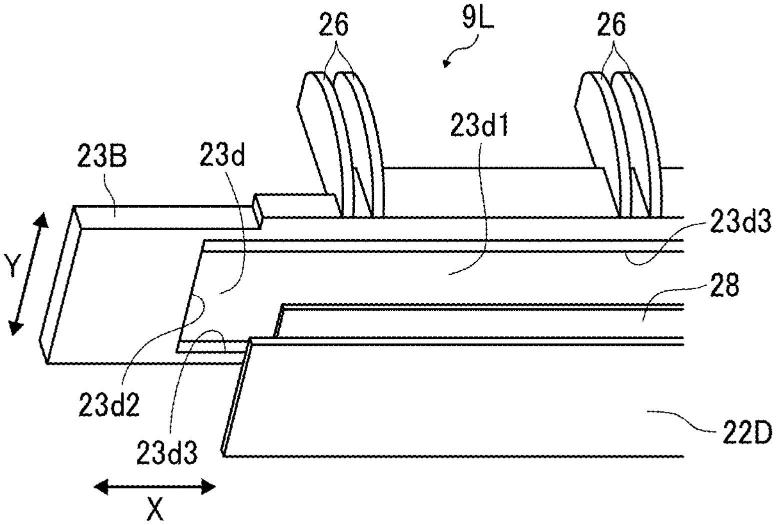
FIG. 39 is a perspective view of the heater depicted in FIG. 38 and a heater holder incorporated in the fixing device depicted in FIG. 37.

As illustrated in FIG. 39, the heater holder 23B includes a recess 23*d* that holds the heater 22D and the first thermal conductor 28. The recess 23*d* is disposed on a heater opposed face of the heater holder 23B, that is disposed opposite the heater 22D. The recess 23*d* includes a bottom face 23*d*1 and walls 23*d*2 and 23*d*3. The bottom face 23*d*1 is substantially parallel to the base 30 and recessed with respect to the heater 22D compared to other faces of the heater holder 23B. The wall 23*d*2 is disposed at at least one of both lateral ends of the heater holder 23B in the longitudinal direction X thereof and serves as an interior wall of the heater holder 23B. The walls 23*d*3 are disposed at both ends of the heater holder 23B in the orthogonal direction Y thereof and serve as interior walls of the heater holder 23B, respectively. The heater holder 23B includes the guides 26. The heater holder 23B is made of LCP.

Figure 40:
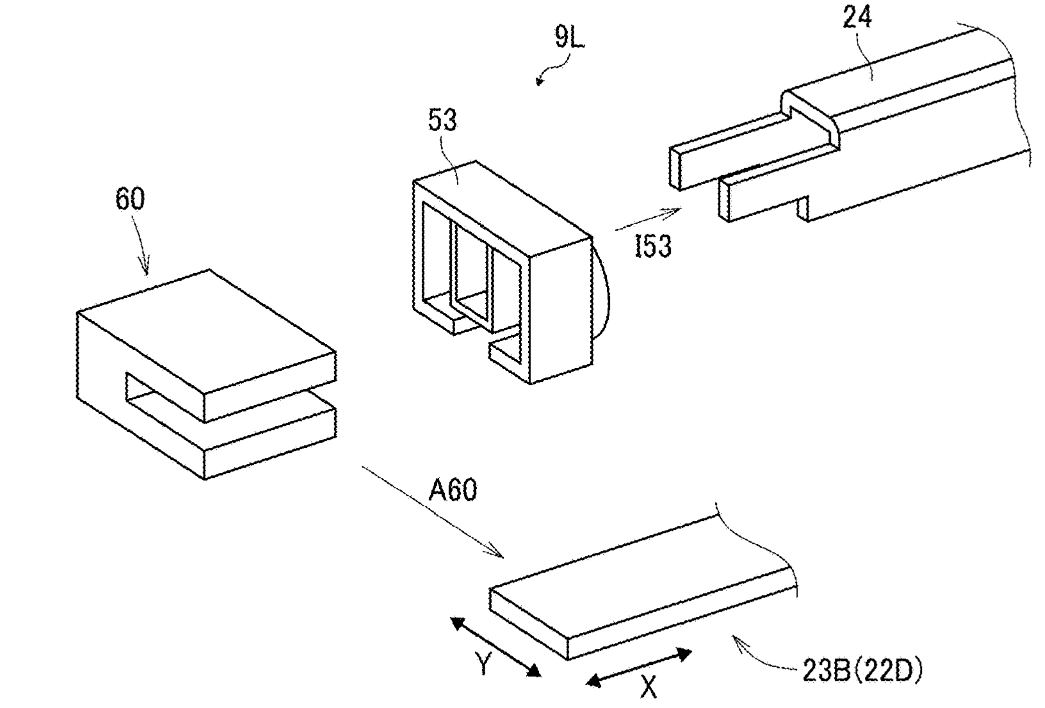
FIG. 40 is a perspective view of the heater depicted in FIG. 39 and a connector to be attached to the heater.

As illustrated in FIG. 40, the fixing device 9L further includes a connector 60 that includes a housing made of resin such as LCP and a plurality of contact terminals disposed in the housing.

The connector 60 is attached to the heater 22D and the heater holder 23B such that the connector 60 sandwiches the heater 22D and the heater holder 23B together at a front face and a back face of the heater 22D and the heater holder 23B. In a state in which the connector 60 sandwiches and holds the heater 22D and the heater holder 23B, as the contact terminals of the connector 60 contact and press against the first electrode 34A, the second electrode 34B, and the third electrode 34C of the heater 22D depicted in FIG. 38, the heat generation portions 35A, 35B, and 35C are electrically connected to a power supply disposed in the image forming apparatus 100A through the connector 60. Thus, the power supply is ready to supply power to the heat generation portions 35A, 35B, and 35C. At least a part of each of the first electrode 34A, the second electrode 34B, and the third electrode 34C is not coated with the insulating layer and is exposed so that each of the first electrode 34A, the second electrode 34B, and the third electrode 34C is coupled with the connector 60.

As illustrated in FIG. 41, the fixing device 9L further includes a flange 53 that is disposed on each lateral end of the fixing belt 20 in the longitudinal direction X thereof. The flange 53 contacts the inner circumferential face 20*a* of the fixing belt 20 and holds or supports the fixing belt 20 at each lateral end of the fixing belt 20 in the longitudinal direction X thereof. The flanges 53 are secured to a frame of the fixing device 9L. The flange 53 is inserted into each lateral end of the stay 24 in the longitudinal direction X thereof in an insertion direction 153 illustrated in FIG. 40.

The connector 60 is attached to the heater 22D and the heater holder 23B in an attachment direction A60 illustrated in FIG. 40 that is parallel to the orthogonal direction Y of the heater 22D. Alternatively, in order to attach the connector 60 to the heater holder 23B, one of the connector 60 and the heater holder 23B may include a projection that engages a recess disposed in another one of the connector 60 and the heater holder 23B such that the projection moves inside the recess relatively. The connector 60 is attached to one lateral end of the heater 22D and the heater holder 23B in the longitudinal direction X of the heater 22D. The one lateral end of the heater 22D and the heater holder 23B is opposite to another lateral end of the heater 22D and the heater holder 23B in the longitudinal direction X of the heater 22D, with which the driver (e.g., a motor) that drives the pressure roller 21 is coupled.

As illustrated in FIG. 41, the thermistors 25 are disposed opposite the inner circumferential face 20*a* of the fixing belt 20 at a position in proximity to a center line L and a position in one lateral end span of the fixing belt 20 in the longitudinal direction X thereof, respectively. The controller 220 depicted in FIG. 14 controls the heater 22D based on a temperature of the fixing belt 20, that is detected by the thermistor 25 disposed at the position in proximity to the center line L, and a temperature of the fixing belt 20, that is detected by the thermistor 25 disposed opposite the one lateral end span of the fixing belt 20 in the longitudinal direction X thereof, respectively.

The thermostats 27 are disposed opposite the inner circumferential face 20*a* of the fixing belt 20 at a position in proximity to the center line L and a position in another lateral end span of the fixing belt 20 in the longitudinal direction X thereof, respectively. If the thermostat 27 detects a temperature of the fixing belt 20, that is higher than a preset threshold, the thermostat 27 breaks power to the heater 22D.

The flanges 53 contact and support both lateral ends of the fixing belt 20 in the longitudinal direction X thereof, respectively. Each of the flanges 53 is made of LCP.

Figure 42:
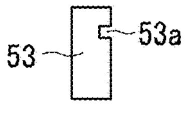
FIG. 42 is a diagram of the flange depicted in FIG. 41, illustrating a slide groove of the flange.

As illustrated in FIG. 42, the flange 53 includes a slide groove 53*a*. The slide groove 53*a* extends in a contact-separation direction in which the fixing belt 20 comes into contact with and separates from the pressure roller 21. The slide groove 53*a* engages an engagement mounted on the frame of the fixing device 9L. As the engagement moves relatively inside the slide groove 53*a*, the fixing belt 20 moves in the contact-separation direction with respect to the pressure roller 21.

The fixing device 9L also incorporates the pivot restrictor such as the pivot restricting rib 23*b* that suppresses pivoting and resultant shifting of the conductive member 40.

The recording media include, in addition to plain paper as a sheet P, thick paper, a postcard, an envelope, thin paper, coated paper, art paper, tracing paper, an overhead projector (OHP) transparency, plastic film, prepreg, and copper foil.

A description is provided of aspects of the embodiments of the present disclosure.

A description is provided of a first aspect of the embodiments of the present disclosure.

As illustrated in FIG. 2, a fixing device (e.g., the fixing devices 9, 9B, 9C, 9D, 9E, 9F, 9G, 9H, 9I, 9J, 9K, and 9L) includes a belt (e.g., the fixing belt 20 and the pressure belt 97), a heater (e.g., the heaters 22, 22A, 22B, 22C, and 22D), a holder (e.g., the heater holders 23, 23A, and 23B and the nip formation pads 85 and 95), a support (e.g., the stays 24 and 96), and a conductive member (e.g., the conductive member 40).

The belt rotates in a rotation direction (e.g., the rotation direction J). The heater is a laminated heater that contacts an inner face (e.g., the inner circumferential face 20*a*) of the belt to heat the belt. The holder holds the heater. The support supports the holder and presses the conductive member against the holder. The conductive member contacts the inner face of the belt and pivots.

As illustrated in FIG. 10, the holder includes a holding portion (e.g., the positioning pin 23*a*) and a pivot restrictor (e.g., the pivot restricting rib 23*b*). The conductive member includes one end portion (e.g., the fixed end 40*a*) in the rotation direction of the belt and an opposed portion (e.g., the opposed portion 40*c*) that abuts on the one end portion. The holding portion of the holder holds the one end portion of the conductive member. The opposed portion of the conductive member is disposed opposite the pivot restrictor of the holder. The pivot restrictor restricts pivoting of the conductive member about the one end portion. In a state in which the support is not installed in the fixing device, the pivot restrictor is higher than the opposed portion of the conductive member. For example, the holder further includes a mount face (e.g., the mount face 23*f*) from which the pivot restrictor projects in a projecting direction (e.g., the projecting direction R). The pivot restrictor projects farther than the opposed portion of the conductive member in the projecting direction of the pivot restrictor in a state in which the support does not press the conductive member against the holder.

A description is provided of a second aspect of the embodiments of the present disclosure.

In the fixing device according to the first aspect, the conductive member has an insertion hole (e.g., the insertion hole 40*e*) that penetrates through the one end portion of the conductive member. The conductive member further includes another end portion (e.g., the free end 40*b*) in the rotation direction of the belt. The another end portion is disposed outboard from the insertion hole in the rotation direction of the belt. The holding portion of the holder is inserted into the insertion hole of the conductive member. The holder further includes a mount (e.g., the end face 260*b*) that is placed with the another end portion of the conductive member. The holding portion of the holder includes an edge (e.g., the edge 23*a*2) that defines an increased length from the mount face in the projecting direction of the pivot restrictor. The edge of the holding portion and the mount define a hypothetical line (e.g., the first hypothetical line L1). The pivot restrictor projects farther than the hypothetical line in the projecting direction of the pivot restrictor.

A description is provided of a third aspect of the embodiments of the present disclosure.

In the fixing device according to the first aspect or the second aspect, as illustrated in FIG. 5, the holder further includes another pivot restrictor (e.g., the pivot restricting rib 23*b*) that restricts pivoting of the conductive member in a pivot direction (e.g., the pivot direction V). The conductive member is interposed between the pivot restrictor and the another pivot restrictor in the pivot direction.

A description is provided of a fourth aspect of the embodiments of the present disclosure.

In the fixing device according to any one of the first aspect to the third aspect, as illustrated in FIG. 2, the holder further includes a sandwich portion (e.g., the second opposed face 26*a*) that sandwiches the conductive member together with the support. The pivot restrictor is interposed between the holding portion and the sandwich portion.

A description is provided of a fifth aspect of the embodiments of the present disclosure.

In the fixing device according to any one of the first aspect to the fourth aspect, the belt is made of polyimide.

A description is provided of a sixth aspect of the embodiments of the present disclosure.

As illustrated in FIGS. 33, 34, and 35, a fixing device (e.g., the fixing devices 9I, 9J, and 9K) includes a belt (e.g., the fixing belt 20 and the pressure belt 97), an opposed rotator (e.g., the pressure roller 21 and the fixing roller 93), a heater (e.g., the heaters 22, 22A, 22B, 22C, and 22D), a nip formation pad (e.g., the nip formation pads 85 and 95), a conductive member (e.g., the conductive member 40), a support (e.g., the stays 24 and 96), a holding portion (e.g., the pivot restricting pin 23*a*), a pivot restrictor (e.g., the pivot restricting rib 23*b*), and a mount face (e.g., the mount face 23*f*).

The belt rotates in a rotation direction (e.g., the rotation directions J and J97). The opposed rotator is disposed opposite the belt. The nip formation pad contacts an inner face (e.g., the inner circumferential faces 20*a* and 97*a*) of the belt to form a nip (e.g., the fixing nips N and N2) between the belt and the opposed rotator. The support supports the nip formation pad and presses the conductive member against the nip formation pad. The heater heats one of the belt and the opposed rotator. The conductive member contacts the inner face of the belt. The conductive member includes one end portion (e.g., the fixed end 40*a*) in the rotation direction of the belt and an opposed portion (e.g., the opposed portion 40*c*) that abuts on the one end portion. The holding portion holds the one end portion of the conductive member. The opposed portion of the conductive member is disposed opposite the pivot restrictor of the holder. The pivot restrictor restricts pivoting of the conductive member about the one end portion. The pivot restrictor projects from the mount face in a projecting direction (e.g., the projecting direction R). In a state in which the support is not installed in the fixing device, that is, in a state in which the support does not press the conductive member against the nip formation pad, the pivot restrictor projects farther than the opposed portion of the conductive member in the projecting direction of the pivot restrictor.

A description is provided of a seventh aspect of the embodiments of the present disclosure.

As illustrated in FIGS. 1 and 36, an image forming apparatus (e.g., the image forming apparatuses 100 and 100A) includes a transfer roller (e.g., the secondary transfer roller 13) that contacts a recording medium (e.g., the sheet P) and the fixing device according to any one of the first aspect to the sixth aspect that is disposed downstream from the transfer roller in a recording medium conveyance direction (e.g., the sheet conveyance direction A) and contacts the recording medium.

Accordingly, the pivot restrictor suppresses pivoting and resultant shifting of the conductive member.

According to the embodiments described above, the fixing belt 20 serves as a belt.

Alternatively, a fixing film, a fixing sleeve, or the like may be used as a belt. Further, the pressure roller 21 serves as an opposed rotator. Alternatively, a pressure belt or the like may be used as an opposed rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:
a belt to rotate in a rotation direction;
a heater to heat the belt;
a holder to hold the heater;
a conductive member to contact an inner face of the belt, the conductive member to pivot,
the conductive member including:
one end portion in the rotation direction of the belt; and
an opposed portion abutting on the one end portion; and
a support to support the holder and press the conductive member against the holder,
the holder including:
a holding portion to hold the one end portion of the conductive member;
a pivot restrictor to restrict pivoting of the conductive member about the one end portion; and
a mount face from which the pivot restrictor projects in a projecting direction,
the pivot restrictor to project farther than the opposed portion of the conductive member in the projecting direction of the pivot restrictor in a state in which the support does not press the conductive member against the holder.

2. The fixing device according to claim 1,
wherein the heater includes a laminated heater to contact the inner face of the belt.

3. The fixing device according to claim 1,
wherein the opposed portion of the conductive member is disposed opposite the pivot restrictor of the holder in a state in which the support presses the conductive member against the holder.

4. The fixing device according to claim 1,
wherein the conductive member has an insertion hole penetrating through the one end portion,
wherein the conductive member further includes another end portion in the rotation direction of the belt, said another end portion disposed outboard from the insertion hole in the rotation direction of the belt,
wherein the holding portion of the holder is inserted into the insertion hole of the conductive member, and
wherein the holder further includes a mount placed with said another end portion of the conductive member.

5. The fixing device according to claim 4,
wherein the holding portion of the holder includes an edge that defines an increased length from the mount face in the projecting direction of the pivot restrictor,
wherein the edge of the holding portion and the mount define a hypothetical line, and
wherein the pivot restrictor projects farther than the hypothetical line in the projecting direction of the pivot restrictor.

6. The fixing device according to claim 4,
wherein the one end portion of the conductive member includes a fixed end and said another end portion of the conductive member includes a free end.

7. The fixing device according to claim 1,
wherein the holder further includes another pivot restrictor to restrict pivoting of the conductive member in a pivot direction, and
wherein the conductive member is interposed between the pivot restrictor and said another pivot restrictor in the pivot direction.

8. The fixing device according to claim 1,
wherein the holder further includes a sandwich portion to sandwich the conductive member together with the support, and
wherein the pivot restrictor is interposed between the holding portion and the sandwich portion.

9. The fixing device according to claim 1,
wherein the belt is made of polyimide.

10. The fixing device according to claim 1,
wherein the support includes a stay.

11. The fixing device according to claim 1,
wherein the pivot restrictor includes a rib.

12. The fixing device according to claim 1,
wherein the holding portion includes a pin.

13. The fixing device according to claim 1,
wherein the conductive member includes a flexible sheet.

14. A fixing device comprising:
a belt to rotate in a rotation direction;
an opposed rotator disposed opposite the belt;
a heater to heat one of the belt and the opposed rotator;
a nip formation pad to contact an inner face of the belt to form a nip between the belt and the opposed rotator;
a conductive member to contact the inner face of the belt, the conductive member including:
one end portion in the rotation direction of the belt; and
an opposed portion abutting on the one end portion;
a support to support the nip formation pad, the support to press the conductive member against the nip formation pad;
a holding portion to hold the one end portion of the conductive member;
a pivot restrictor to restrict pivoting of the conductive member about the one end portion; and
a mount face from which the pivot restrictor projects in a projecting direction,
the pivot restrictor to project farther than the opposed portion of the conductive member in the projecting direction of the pivot restrictor in a state in which the support does not press the conductive member against the nip formation pad.

15. The fixing device according to claim 14,
wherein the opposed rotator presses against the nip formation pad via the belt in a pressing direction that is parallel to the projecting direction of the pivot restrictor.

16. An image forming apparatus comprising:
a transfer roller to contact a recording medium; and
a fixing device disposed downstream from the transfer roller in a recording medium conveyance direction,
the fixing device including:
a belt to contact the recording medium and rotate in a rotation direction;
a heater to contact an inner face of the belt;
a holder to hold the heater;
a conductive member to contact the inner face of the belt, the conductive member to pivot,
the conductive member including:
one end portion in the rotation direction of the belt; and
an opposed portion abutting on the one end portion; and
a support to support the holder and press the conductive member against the holder,
the holder including:
a holding portion to hold the one end portion of the conductive member;
a pivot restrictor to restrict pivoting of the conductive member about the one end portion; and
a mount face from which the pivot restrictor projects in a projecting direction,
the pivot restrictor to project farther than the opposed portion of the conductive member in the projecting direction of the pivot restrictor in a state in which the support does not press the conductive member against the holder.

* * * * *